(12) United States Patent
Arpin et al.

(10) Patent No.: US 7,813,990 B1
(45) Date of Patent: *Oct. 12, 2010

(54) PROPERTY INVESTMENT RATING SYSTEM AND METHOD

(75) Inventors: Jeffrey L. Arpin, Vienna, VA (US);
Michael W. Dick, Arlington, VA (US);
Thomas P. Edgar, Vienna, VA (US);
Brian Hunt, Olney, MD (US)

(73) Assignee: Fannie Mae, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/697,793

(22) Filed: Feb. 1, 2010

Related U.S. Application Data

(63) Continuation of application No. 11/026,433, filed on Dec. 30, 2004, now Pat. No. 7,657,475.

(60) Provisional application No. 60/533,566, filed on Dec. 31, 2003, provisional application No. 60/533,548, filed on Dec. 31, 2003.

(51) Int. Cl.
*G06Q 40/00* (2006.01)

(52) U.S. Cl. .................................................. 705/36 R

(58) Field of Classification Search .................... 705/35
See application file for complete search history.

(56) References Cited

U.S. PATENT DOCUMENTS

| | | | |
|---|---|---|---|
| 3,316,395 A | 4/1967 | Lavin | |
| 4,876,648 A | 10/1989 | Lloyd | |
| 5,239,462 A | 8/1993 | Jones et al. | |
| 5,262,941 A | 11/1993 | Saladin et al. | |
| 5,274,547 A | 12/1993 | Zoffel et al. | |
| 5,323,315 A | 6/1994 | Highbloom | |
| 5,361,201 A | 11/1994 | Jost et al. | |
| 5,414,621 A | 5/1995 | Hough | |
| 5,537,315 A | 7/1996 | Mitcham | |
| 5,563,783 A | 10/1996 | Stolfo et al. | |
| 5,611,052 A | 3/1997 | Dykstra et al. | |
| 5,615,268 A | 3/1997 | Bisbee et al. | |

(Continued)

FOREIGN PATENT DOCUMENTS

JP    04182868    6/1992

(Continued)

OTHER PUBLICATIONS

Ziobrowski et al: Higher real estate risk and mixed-asset portfolio performance, 1997, Journal of Real Estate Portfolio Management, vol. 3, No. 2, pp. 107-115.*

(Continued)

*Primary Examiner*—Hani Kazimi
*Assistant Examiner*—Bijendra K Shrestha
(74) *Attorney, Agent, or Firm*—Foley & Lardner LLP

(57) ABSTRACT

A property investment management tool comprises user interface logic and an investment rating engine. The user interface logic is configured to provide a user interface accessible to a user and includes risk profile configuration interface logic configured to permit a user to define a plurality of different risk profiles for a plurality of different investments. The investment rating engine is coupled to the user interface logic and is configured to evaluate the plurality of different investments according to the plurality of different risk profiles.

19 Claims, 28 Drawing Sheets

U.S. PATENT DOCUMENTS

| | | | |
|---|---|---|---|
| 5,689,649 | A | 11/1997 | Altman et al. |
| 5,696,907 | A | 12/1997 | Tom |
| 5,699,527 | A | 12/1997 | Davidson |
| 5,732,400 | A | 3/1998 | Mandler et al. |
| 5,765,144 | A | 6/1998 | Larche et al. |
| 5,797,133 | A | 8/1998 | Jones et al. |
| 5,870,721 | A | 2/1999 | Norris |
| 5,878,403 | A | 3/1999 | DeFrancesco et al. |
| 5,878,404 | A | 3/1999 | Stout, Jr. et al. |
| 5,930,775 | A | 7/1999 | McCauley et al. |
| 5,930,776 | A | 7/1999 | Dykstra et al. |
| 5,940,811 | A | 8/1999 | Norris |
| 5,940,812 | A | 8/1999 | Tengel et al. |
| 5,966,699 | A | 10/1999 | Zandi |
| 5,966,700 | A | 10/1999 | Gould et al. |
| 5,970,464 | A | 10/1999 | Apte et al. |
| 5,974,372 | A | 10/1999 | Barnes et al. |
| 5,983,206 | A | 11/1999 | Oppenheimer |
| 5,995,947 | A | 11/1999 | Fraser et al. |
| 6,014,645 | A | 1/2000 | Cunningham |
| 6,021,202 | A | 2/2000 | Anderson et al. |
| 6,029,149 | A | 2/2000 | Dystra et al. |
| 6,035,288 | A | 3/2000 | Solomon |
| 6,044,362 | A | 3/2000 | Neely |
| 6,070,151 | A | 5/2000 | Frankel |
| 6,076,070 | A | 6/2000 | Stack |
| 6,088,686 | A | 7/2000 | Walker et al. |
| 6,105,007 | A | 8/2000 | Norris |
| 6,112,190 | A | 8/2000 | Fletcher et al. |
| 6,119,103 | A | 9/2000 | Basch et al. |
| 6,125,349 | A | 9/2000 | Maher |
| 6,144,948 | A | 11/2000 | Walker et al. |
| 6,202,053 | B1 | 3/2001 | Christiansen et al. |
| 6,226,624 | B1 | 5/2001 | Watson et al. |
| 6,233,566 | B1 | 5/2001 | Levine et al. |
| 6,289,319 | B1 | 9/2001 | Lockwood |
| 6,311,169 | B2 | 10/2001 | Duhon |
| 6,324,526 | B1 | 11/2001 | D'Agostino |
| 6,367,013 | B1 | 4/2002 | Bisbee et al. |
| 6,385,594 | B1 | 5/2002 | Lebda et al. |
| 6,401,070 | B1 | 6/2002 | McManus et al. |
| 6,405,181 | B2 | 6/2002 | Lent et al. |
| 6,430,539 | B1 | 8/2002 | Lazarus et al. |
| 6,438,526 | B1 | 8/2002 | Dykes et al. |
| 6,505,176 | B2 | 1/2003 | DeFrancesco, Jr. et al. |
| 6,513,018 | B1 | 1/2003 | Culhane |
| 6,532,450 | B1 | 3/2003 | Brown et al. |
| 6,564,190 | B1 | 5/2003 | Dubner |
| 6,584,467 | B1 | 6/2003 | Haught et al. |
| 6,594,635 | B1 | 7/2003 | Erlanger |
| 6,609,109 | B1 | 8/2003 | Bradley et al. |
| 6,611,816 | B2 | 8/2003 | Lebda et al. |
| 6,651,884 | B2 | 11/2003 | Predergast et al. |
| 6,671,673 | B1 | 12/2003 | Baseman et al. |
| 6,823,319 | B1 | 11/2004 | Lynch et al. |
| 6,985,881 | B2 | 1/2006 | Johnson et al. |
| 7,027,997 | B1 | 4/2006 | Robinson et al. |
| 7,146,337 | B1 | 12/2006 | Ward et al. |
| 7,319,971 | B2 | 1/2008 | Abrahams et al. |
| 7,346,573 | B1 | 3/2008 | Cobrinik et al. |
| 7,657,475 | B1 | 2/2010 | Arpin et al. |
| 2001/0029482 | A1 | 10/2001 | Tealdi et al. |
| 2001/0032178 | A1 | 10/2001 | Adams et al. |
| 2001/0037287 | A1 | 11/2001 | Broadbent et al. |
| 2002/0029154 | A1 | 3/2002 | Majoor |
| 2002/0029194 | A1 | 3/2002 | Lewis et al. |
| 2002/0032635 | A1 | 3/2002 | Harris et al. |
| 2002/0035520 | A1 | 3/2002 | Weiss |
| 2002/0038318 | A1 | 3/2002 | Cochran et al. |
| 2002/0040312 | A1 | 4/2002 | Dhar et al. |
| 2002/0040339 | A1 | 4/2002 | Dhar et al. |
| 2002/0052815 | A1 | 5/2002 | Johnson et al. |
| 2002/0052835 | A1 | 5/2002 | Toscano |
| 2002/0055905 | A1 | 5/2002 | Jannah et al. |
| 2002/0059137 | A1 | 5/2002 | Freeman et al. |
| 2002/0077968 | A1 | 6/2002 | Kaniwa et al. |
| 2002/0087364 | A1 | 7/2002 | Lerner et al. |
| 2002/0087389 | A1 | 7/2002 | Sklarz et al. |
| 2002/0091550 | A1 | 7/2002 | White et al. |
| 2002/0091630 | A1 | 7/2002 | Inoue |
| 2002/0099650 | A1 | 7/2002 | Cole |
| 2002/0111835 | A1 | 8/2002 | Hele et al. |
| 2002/0111901 | A1 | 8/2002 | Whitney |
| 2002/0138414 | A1 | 9/2002 | Baker, IV |
| 2002/0152155 | A1 | 10/2002 | Greenwood et al. |
| 2002/0152165 | A1 | 10/2002 | Dutta et al. |
| 2002/0152170 | A1 | 10/2002 | Dutta et al. |
| 2003/0023610 | A1 | 1/2003 | Bove et al. |
| 2003/0028478 | A1 | 2/2003 | Kinney et al. |
| 2003/0033241 | A1 | 2/2003 | Harari |
| 2003/0033242 | A1 | 2/2003 | Lynch et al. |
| 2003/0036994 | A1 | 2/2003 | Witzig et al. |
| 2003/0036995 | A1 | 2/2003 | Lazerson |
| 2003/0036996 | A1 | 2/2003 | Lazerson |
| 2003/0046223 | A1 | 3/2003 | Crawford et al. |
| 2003/0065614 | A1 | 4/2003 | Sweeney |
| 2003/0093366 | A1 | 5/2003 | Halper et al. |
| 2003/0110249 | A1 | 6/2003 | Buus et al. |
| 2003/0144949 | A1 | 7/2003 | Blanch |
| 2003/0163337 | A1 | 8/2003 | Kasten |
| 2003/0167191 | A1 | 9/2003 | Slabonik et al. |
| 2003/0172025 | A1 | 9/2003 | Gallina |
| 2003/0177032 | A1 | 9/2003 | Bonissone et al. |
| 2003/0182159 | A1 | 9/2003 | Bonissone et al. |
| 2003/0187696 | A1 | 10/2003 | Bonissone et al. |
| 2003/0187697 | A1 | 10/2003 | Bonissone et al. |
| 2003/0187698 | A1 | 10/2003 | Bonissone et al. |
| 2003/0187699 | A1 | 10/2003 | Bonissone et al. |
| 2003/0187700 | A1 | 10/2003 | Bonissone et al. |
| 2003/0187701 | A1 | 10/2003 | Bonissone et al. |
| 2003/0187702 | A1 | 10/2003 | Bonissone et al. |
| 2003/0208385 | A1 | 11/2003 | Zander et al. |
| 2003/0212654 | A1 | 11/2003 | Harper et al. |
| 2003/0217034 | A1 | 11/2003 | Shutt |
| 2003/0220879 | A1 | 11/2003 | Gaughan et al. |
| 2003/0225662 | A1 | 12/2003 | Horan et al. |
| 2003/0229553 | A1 | 12/2003 | Kongyingyong et al. |
| 2003/0229581 | A1 | 12/2003 | Green et al. |
| 2003/0233260 | A1 | 12/2003 | Snell et al. |
| 2003/0233316 | A1 | 12/2003 | Hu et al. |
| 2004/0002915 | A1 | 1/2004 | McDonald et al. |
| 2004/0019517 | A1 | 1/2004 | Sennott |
| 2004/0030616 | A1 | 2/2004 | Florance et al. |
| 2004/0030649 | A1 | 2/2004 | Nelson et al. |
| 2004/0034592 | A1 | 2/2004 | Hu et al. |
| 2004/0049439 | A1 | 3/2004 | Johnston et al. |
| 2004/0049445 | A1 | 3/2004 | Kishore |
| 2004/0059653 | A1 | 3/2004 | Verkuylen et al. |
| 2004/0064402 | A1 | 4/2004 | Dreyer et al. |
| 2004/0107161 | A1 | 6/2004 | Tanaka et al. |
| 2004/0122717 | A1 | 6/2004 | Handcock |
| 2005/0021390 | A1 | 1/2005 | Porter et al. |
| 2005/0027651 | A1 | 2/2005 | DeVault |
| 2005/0251475 | A1 | 11/2005 | Sato |
| 2006/0074793 | A1 | 4/2006 | Hibbert et al. |

FOREIGN PATENT DOCUMENTS

| | | |
|---|---|---|
| JP | 2002007701 | 1/2002 |
| JP | 2002259696 | 9/2002 |
| JP | 2002288426 | 10/2002 |
| JP | 2003223559 | 8/2003 |
| WO | WO 9948036 | 9/1999 |
| WO | WO 0021011 | 4/2000 |

| | | |
|---|---|---|
| WO | WO 0062209 | 10/2000 |
| WO | WO 0075833 | 12/2000 |
| WO | WO 0116845 | 3/2001 |
| WO | WO 0118718 | 3/2001 |
| WO | WO 01/27832 | 4/2001 |
| WO | WO 0133461 | 5/2001 |
| WO | WO 0139079 | 5/2001 |
| WO | WO 01/41019 | 6/2001 |
| WO | WO 0150318 | 7/2001 |
| WO | WO 0163445 | 8/2001 |
| WO | WO 0163446 | 8/2001 |
| WO | WO 0163534 | 8/2001 |
| WO | WO 0180123 | 10/2001 |
| WO | WO 0198999 | 12/2001 |
| WO | WO 02/06989 | 1/2002 |
| WO | WO 0208855 | 1/2002 |
| WO | WO 0223443 | 3/2002 |
| WO | WO 02/084925 | 10/2002 |
| WO | WO 02093286 | 11/2002 |
| WO | WO 03009152 | 1/2003 |
| WO | WO 03/071380 | 8/2003 |
| WO | WO 03/071388 | 8/2003 |

OTHER PUBLICATIONS

Byrne et al.: Risk reduction and real estate portfolio size, Managerial and Decision Economics, 2001, The University of Reading, UK, 22, pp. 369-379.*

Office Action for U.S. Appl. No. 11/026,102, mail date Aug. 4, 2008, 19 pages.

Office Action for U.S. Appl. No. 11/026,102, mail date Dec. 8, 2009, 6 pages.

Office Action for U.S. Appl. No. 11/026,102, mail date Feb. 23, 2009, 22 pages.

U.S. Appl. No. 11/026,102, filed Dec. 30, 2004, Arpin et al.

Fannie Mae, "Guide to Underwriting with Desktop Underwriter®", Sep. 2002; 63 pgs.

Edocs, "edocs Teams with Fannie Mae to Offer Lenders Online Account Management Solution," Press Release, Mar. 12, 2001, 2 pgs., edocs, Inc., USA.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.

Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Object Management Group, "Fannie Mae", CORBA Banking/Finance, Sep. 17, 2001, 2 pgs, Object Management Group, Needham, MA, USA.

Smith Tom, "E-Commerce Holds Keys to Home Ownership: Fannie Mae drives hug volumes of mortgage business to its e-marketplace," Internetweek.com, Undated, 5 pgs., Internetweek.com, USA.

Smith Tom, "Fannie Mae Ramps up Web Apps: Q&A with Julie St. John, Executive Vice President and Chief Technology Office and Michael Williams President of Fannie Mae e-Business," Internetweek.com, Undated, 11 pgs., Internetweek.com, USA.

Sun, "Success on Sun: Software Development Case Study Federal National Mortgage Association (Fannie Mae)," Mar. 1995, 10 pgs, Sun, USA.

Raines Franklin D., "Speech by Franklin D. Raines Chairman and CEO of Fannie Mae, Fannie Mae and the Mortgage Industry in the E-Commerce Age," May 8, 2000, 20 pgs., Fannie Mae, USA.

Williams Michael, "Technology and Other Keys to the Boom in Refinancing," American Banker, Apr. 20, 2003, 3 pgs, vol. 168, Issue 63, p. 8., American Banker USA.

Breakthroughs in Mortgage Banking: Looking Toward the Future, Real Estate Finance Press, Mortgage Bankers Association of America, 1996, pp. 5-1-5-8, ISBN 1-57599-016-4, Jess Lderman, Editor.

Fannie Mae, "Delivering Loans for MBS", 1996, 138 pages, Fannie Mae, Washington, DC, USA.

Fannie Mae, "Guide to Underwriting with Desktop Underwriter", Oct. 1997, 152 pages, Verison 4.0, Fannie Mae, Washington, DC, USA.

Fannie Mae, "MORNET MBS Pool Submission System User's Guide", Sep. 1998, 259 pages, Version 5.3, Fannie Mae, Washington, DC, USA.

Fannie Mae, "Making Good Delivery a Guide to Delivering Loans for Cash and MBS", 1994, 121 pages, Fannie Mae, Washington, DC, USA.

Fannie Mae, "MORNET Cash Delivery System User's Guide", Nov. 1997, 177 pages, Version 2.6, Fannie Mae, Washington, DC, USA.

Fannie Mae, "Delivering Loans for Cash", 1997, 96 pages, Fannie Mae, Washington, DC, USA.

Fannie Mae, "MORNET Manager User's Guide", Nov. 1998, 187 pages, Version 3.0, Fannie Mae, Washington, DC, USA.

Fannie Mae, "MORNET Servicing Support System User's Guide", Dec. 1998, 370 pages, Fannie Mae, Washington, DC, USA.

Fannie Mae, "Selling", 1995-2002 et al, 1119 pgs, Fannie Mae, USA.

Fannie Mae, "Investor Accounting: Cash", 1996, 132 pages, Fannie Mae, Washington, DC, USA.

Fannie Mae, "Secondary Marketing: Cash", 1997, 81 pages, Fannie Mae, USA.

Fannie Mae, "General Servicing Fundamentals", 1996, 174 pages, Fannie Mae, USA.

Laser Overview, May 1993, chapters 1-18.

Fannie Mae, "Servicing Guide", 1995-2002 et al, 319 pages, Forward, Table of Contents, Sections III, IX, X, and XI, Fannie Mae, USA.

Ziobrowski et al: Higher real estate risk and mixed-asset portfolio performance, 1997, Journal of Real Estate Portfolio Management, vol. 3, No. 2, pp. 107-115.

Ebner et al. : The Value of real estate for a property portfolio, Leipzig Annual Civil Engineering Report (LACER), No. 2, 1997, pp. 459-467.

Byrne et al.: Risk reduction and real estate portfolio size, Managerial and Decision Economics, 2001, The University of Reading, UK, 22, pp. 369-379.

Notice of Allowance dated Jun. 11, 2010 on U.S. Appl. No. 11/026,102.

Notice of Allowance dated Jun. 29, 2009 on U.S. Appl. No. 11/026,433.

* cited by examiner

PRODUCT RISK PROFILE [MAIN]

| | |
|---|---|
| PRODUCT RISK PROFILE | DUS BASE |
| RISK PROFILE DESCRIPTION | DEFAULT RISK PROFILE TYPE |

| | |
|---|---|
| FINANCIALS / OPERATIONS | 20% SCALE |
| DEBT COVERAGE RATIO | 20% DUS DC BASE |
| CURRENT LTV | 15% SCALE |
| REFINANCE RISK | 5% SCALE |
| MARKET | 15% SCALE |
| PROPERTY CONDITION | 10% SCALE |
| PROPERTY MANAGEMENT | 10% SCALE |
| SPONSOR | 0% SCALE |
| CUSTOMER | 5% SCALE |
| TOTAL | 100% |

THE TOTAL OF CATEGORY WEIGHTING SHOULD ALWAYS EQUAL "100%" — 421

MARKET SCALE — 601g

MARKET DATA — 423

| MSA # | MARKET | REIS MARKET / SUBMARKET | RATING |
|---|---|---|---|
| 0200 | ALBUQUERQUE | ALBUQUERQUE, NM | RED |
| 0520 | ATLANTA | ATLANTA, GA | RED |
| 0640 | AUSTIN | AUSTIN-SAN MARCOS, TX | RED |
| 0720 | BALTIMORE | BALTIMORE, MD | GREEN |
| 1000 | BIRMINGHAM | BIRMINGHAM, AL | YELLOW |
| 1120 | BOSTON | BOSTON, MA-NH | YELLOW |
| 1200 | BOSTON | BROCKTON, MA | YELLOW |
| 4160 | BOSTON | LAWRENCE, MA-NH | YELLOW |
| 4560 | BOSTON | LOWELL, MA-NH | YELLOW |
| 1280 | BUFFALO | BUFFALO-NIAGARA FALLS, NY | YELLOW |
| 5015 | CENTRAL NEW JERSE | MIDDLESEX-SOMERSET-HUNTERDON, NJ | YELLOW |
| 5190 | CENTRAL NEW JERSE | MONMOUTH-OCEAN, NJ | YELLOW |
| 6160 | CENTRAL NEW JERSE | PHILADELPHIA, PA-NJ | YELLOW |
| 8480 | CENTRAL NEW JERSE | TRENTON, NJ | YELLOW |
| 1440 | CHARLESTON | CHARLESTON-NORTH CHARLESTON, SC | RED |
| 1520 | CHARLOTTE | CHARLOTTE-GASTONIA-ROCK HILL, NC-SC | RED |
| 1560 | CHATTANOOGA | CHATTANOOGA, TN-GA | RED |
| 1600 | CHICAGO | CHICAGO, IL | ORANGE |
| 1640 | CINCINNATI | CINCINNATI, OH-KY-IN | RED |
| 3200 | CINCINNATI | HAMILTON-MIDDLETOWN, OH | RED |

MARKET SCORING GRID — 424

| RATING | SCORE | SOURCE | TRIP ? |
|---|---|---|---|
| GREEN | 100 | | NO DE |
| YELLOW | 75 | | NO DE |
| ORANGE | 50 | | NO DE |
| RED | 25 | | NO DE |
| MISSING | 25 | | NO DE |

DOCUMENTATION

DEBT COVERAGE RATIO RISK PROFILE [MAIN]

DEBT COV RISK PROFILE TYPE: DUS DC BASE — 180a
RISK PROFILE DESCRIPTION: DEFAULT DEBT COV PROFILE — 180b

| SCALE1 | | SCALE2 | SCORE | SOURCE | TRIP ? | |
|---|---|---|---|---|---|---|
| >= 1.25 | < | | 100 | | NO | DE |
| >= 1.15 | < | 1.25 | 75 | | NO | DE |
| >= 1.05 | < | 1.15 | 50 | | NO | DE |
| >= | < | 1.05 | 25 | | YES | DE |

194 — SCALE1
190 — scale range
192 — SCORE
601o

FIG. 17

DEBT COVERAGE RATIO RISK PROFILE [MAIN]

DEBT COV RISK PROFILE TYPE: DUS DC COOP — 180a
RISK PROFILE DESCRIPTION: DUS COOP LOANS — 180b

| SCALE1 | | SCALE2 | SCORE | SOURCE | TRIP ? | |
|---|---|---|---|---|---|---|
| >= 1.10 | < | | 100 | | NO | DE |
| >= 1.00 | < | 1.10 | 90 | | NO | DE |
| >= 0.95 | < | 1.00 | 80 | | NO | DE |
| >= 0.90 | < | 0.95 | 75 | | NO | DE |
| >= 0.85 | < | 0.90 | 50 | | NO | DE |
| >= 0.80 | < | 0.85 | 25 | | NO | DE |
| >= | < | 0.80 | 0 | | NO | DE |

601p

DEBT HISTORICAL RATING RESULTS

RUN DATE AND TIME: 7/13/2003 8:33:12 PM

| LOAN NUMBER | SERVICER | IN WL | WL RTG | TRIP | ASSET MGR | OVERALL RATING | OPNS RATING | DEBT COV RATING | PROPERTY RATING | CURR LTV RATING | MARKET RATING | REFI RISK RATING | CUSTOMER RATING | PROP MGT RATING |
|---|---|---|---|---|---|---|---|---|---|---|---|---|---|---|
| 0000980063 | | NO | | NO | FRUEH | 82 | 62 | 75 | 100 | 100 | 100 | 100 | 75 | 62 |
| 0000980153 | | NO | | YES | FRUEH | 85 | 69 | 100 | 54 | 100 | 100 | 100 | 92 | 62 |
| 0000980155 | | NO | | NO | COHN | 84 | 62 | 100 | 99 | 100 | 50 | 100 | 92 | 100 |
| 0000980242 | | NO | | NO | COHN | 88 | 81 | 100 | 99 | 100 | 50 | 100 | 92 | 100 |
| 0000980438 | | YES | SM | YES | FRUEH | 53 | 44 | 25 | 99 | 75 | 25 | 25 | 92 | 88 |
| 0000980486 | | NO | | NO | COHN | 87 | 44 | 100 | 99 | 100 | 100 | 100 | 83 | 88 |
| 0000980557 | | YES | SM | YES | COHN | 70 | 62 | 25 | 100 | 100 | 50 | 100 | 92 | 100 |
| 0000980572 | | NO | | NO | COHN | 87 | 75 | 100 | 99 | 100 | 50 | 100 | 92 | 100 |
| 0000980653 | | NO | | NO | COHN | 80 | 44 | 100 | 99 | 50 | 100 | 100 | 83 | 100 |
| 0000980865 | | YES | SM | YES | FRUEH | 61 | 62 | 50 | 80 | 25 | 75 | 25 | 92 | 100 |
| 0000981104 | | NO | | NO | DICK | 71 | 62 | 75 | 96 | 100 | 25 | 100 | 84 | 62 |
| 0000981144 | | NO | | NO | FRUEH | 80 | 62 | 75 | 100 | 100 | 50 | 100 | 92 | 100 |
| 0000981314 | | NO | | NO | COHN | 95 | 100 | 100 | 84 | 100 | 100 | 100 | 58 | 88 |

FIG. 19

REVIEW DEBT HISTORICAL RATING RESULTS

601u

| | SECTION WEIGHTING | SYSTEM GRADES | ASSET MGR GRADES | | SYSTEM GENERATED COMMENTS | ASSET MANAGER COMMENTS |
|---|---|---|---|---|---|---|
| OPERATIONS | 20% | 62 | 62 | R | | |
| DEBT COV | 20% | 75 | 75 | R | | |
| PROPERTY | 10% | 100 | 100 | R | DATA MISSING - RETWALL; | |
| CURRENT LTV | 15% | 100 | 100 | R | NATIONAL U/W & CURRYR AVG USED; | |
| SPONSOR | 0% | 0 | 0 | R | DATA MISSING - APPEXP; | |
| MARKET | 15% | 100 | 100 | R | | |
| REFI RISK | 5% | 100 | 100 | R | | |
| PROP MGMT | 10% | 62 | 62 | R | | |
| CUSTOMER | 5% | 75 | 75 | R | | |
| OVERALL | 100% | 82 | 82 | R | | |

NET CHANGE [ ]

235

NOTE: PRESS "R" TO RESET THE ASSET MANAGER SCORE BACK TO THE SYSTEM SCORE

TRIPS

| CATEGORY | FLAGS | FOLLOW UP | AUTHOR | ADDED ON | LAST MOD DT | COMMENTS |
|---|---|---|---|---|---|---|
| REFINANCE RISK | REFINANCE RISK VALUE < 1.05 | SYSTEM POSTED | SYSTEM | 6/9/2003 | 6/9/2003 | |

MAIN

| SECTION WEIGHTING | |
|---|---|
| POST PURCHASE REVIEW ASSEST | 33% |
| OPERATIONS ASSEST | 33% |
| ASSET MANAGEMENT ASSEST | 33% |

| INFORMATION PASSED TO THE LOAN SCORE ENGINE | |
|---|---|
| LENDER NUMBER | 21322 |

| INFORMATION PASSED TO THE LOAN SCORE ENGINE | |
|---|---|
| MATURITY PERIOD | 3 |
| MATURING WITHIN 3 YEARS | YES |
| REFINANCE RISK VALUE | 1.5392023810162 |

| INFORMATION PASSED TO THE LOAN SCORE ENGINE | |
|---|---|
| MSA NUMBER | 8840 |
| DESCRIPTION | #.NAME? |

601w

CURRENT LTV

| INFORMATION PASSED TO THE LOAN SCORE ENGINE | | |
|---|---|---|
| ORIGINAL LOAN AMOUNT | 1% | $3,200,000 |
| U/W NOI | $398,507 | CURRENT YEAR MARKET CAP RATE | 0.00 |
| CURRENT YEAR NOI | $403,532 | U/W MARKET CAP RATE | 0.00 |
| | | CURRENT LOAN AMOUNT | $2,977,449 |
| | | CURR YR MKT CAP RATE SOURCE | NATIONAL |
| | | U/W MKT CAP RATE SOURCE | DEFAULT |

FINANCIALS OPERATIONS DETAILS

RUN DATE AND TIME: 7/13/2003 8:33:12 PM

[CLOSE]

| LOAN NUMBER | LENDER NAME | RATING TYPE | DATA FLAG | OPN SCORE | EGI | UWEGI | UWEXP RATIO | CYEXP RATIO | UWNOI | CYNOI | PREV YR CASH FLOW | CURR YR CASH FLOW |
|---|---|---|---|---|---|---|---|---|---|---|---|---|
| 8000984698 | | DUS BASE | PARTIAL | 88 | $703,491 | $690,785 | 47% | 43% | $363,294 | $404,165 | $0 | $397,630 |
| 1668465941 | | DUS BASE | PARTIAL | 81 | $1,148,037 | $1,081,595 | 31% | 19% | $750,927 | $926,317 | $0 | $892,344 |
| 1666849928 | | DUS BASE | PARTIAL | 62 | $2,266,605 | $2,124,039 | 39% | 51% | $1,302,886 | $1,108,938 | $0 | $1,108,938 |
| 1666557799 | | DUS BASE | PARTIAL | 94 | $2,424,892 | $2,387,099 | 32% | 30% | $1,626,328 | $1,687,280 | $0 | $1,528,863 |
| 1666110571 | | DUS BASE | PARTIAL | 44 | $1,331,166 | $1,524,165 | 39% | 64% | $929,324 | $485,684 | $0 | $122,889 |
| 1669049352 | | DUS BASE | PARTIAL | 62 | $1,353,553 | $1,415,930 | 45% | 34% | $780,322 | $896,541 | $0 | $896,541 |
| 1668985708 | | DUS BASE | PARTIAL | 94 | $1,719,043 | $1,412,183 | 64% | 61% | $514,273 | $665,369 | $0 | $580,262 |
| 1666951980 | | DUS BASE | PARTIAL | 62 | $877,113 | $965,701 | 49% | 51% | $494,640 | $427,632 | $0 | $312,282 |
| 1668604963 | | DUS BASE | PARTIAL | 100 | $715,301 | $578,919 | 54% | 56% | $265,585 | $314,656 | $0 | $253,592 |
| 1664736338 | | DUS BASE | PARTIAL | 88 | $11,872,301 | $7,645,186 | 48% | 43% | $3,958,483 | $6,824,179 | $0 | $6,210,883 |
| 1668604961 | | DUS BASE | PARTIAL | 62 | $1,487,444 | $1,635,612 | 57% | 57% | $704,693 | $632,200 | $0 | $530,152 |

FIG. 21

DEBT COVERAGE RATIO DETAILS

RUN DATE AND TIME: 7/13/2003 8:33:12 PM

| LOAN NUMBER | LENDER NAME | RATING TYPE | DEBT COV. TYPE | ASSET MANAGER | DSCR SCORE | DATA FLAG | CURR Y DSCR |
|---|---|---|---|---|---|---|---|
| 0000980063 | | DUS BASE | DUS DC BASE | FRUEH | 75 | NO | 1.17 |
| 0000980153 | | DUS BASE | DUS DC BASE | FRUEH | 100 | NO | 1.59 |
| 0000980155 | | DUS BASE | DUS DC BASE | COHN | 100 | NO | 1.76 |
| 0000980242 | | DUS BASE | DUS DC BASE | COHN | 100 | NO | 1.91 |
| 0000980438 | | DUS BASE | DUS DC BASE | FRUEH | 25 | NO | 0.86 |
| 0000980486 | | DUS BASE | DUS DC BASE | COHN | 100 | NO | 1.33 |
| 0000980557 | | DUS BASE | DUS DC BASE | COHN | 25 | NO | 1.05 |
| 0000980572 | | DUS BASE | DUS DC BASE | COHN | 100 | NO | 1.95 |

FIG. 22

ABC BANK'S PORTFOLIO SUMMARY

| TOTAL LOANS | 410 | TOTAL CURRENT UPB | $2,628,911,169 | NUMBER OF LOANS ON WATCHLIST | 52 | | 12.68 |

REPORTING | STRATIFICATION | LOAN RATING - GRAPHS | LOAN RATING - DETAILS | WATCHLIST | CREDIT SERVICES | LOANS AWAITING APPROVAL | INTERNAL CONTA

ABC BANK'S RATED PORTFOLIO DETAIL

FILTER BY REVIEW STATUS [ ▼ ] | REFRESH DATA | EXPORT TO EXCEL

| LOAN NUMBER | SERVICER | REVIEW STATUS | IN WL | WL RTG | TRIP | ASSET MGR | OVERALL RATING | OPNS RATING | DEBT COV RATING | PROPERTY RATING |
|---|---|---|---|---|---|---|---|---|---|---|
| 16764 | | OPEN | NO | | YES | FRUEH | 48 | 31 | 25 | 100 |
| 16628 | | OPEN | NO | | NO | FRUEH | 81 | 81 | 100 | 86 |
| 16685 | | OPEN | NO | | NO | FRUEH | 94 | 100 | 100 | 96 |
| 16757 | | APPROVED | YES | LS | YES | MARTIN | 25 | 25 | 90 | 8 |
| 16639 | | APPROVED | YES | SM | YES | BLYDEN | 34 | 25 | 25 | 25 |
| 80009 | | APPROVED | YES | SM | YES | BLYDEN | 38 | 25 | 25 | 25 |
| 80009 | | APPROVED | YES | SM | YES | FRUEH | 41 | 25 | 25 | 90 |
| 16680 | | APPROVED | YES | SM | YES | BLYDEN | 42 | 25 | 25 | 100 |
| 16651 | | APPROVED | YES | SM | YES | FRUEH | 44 | 25 | 25 | 90 |
| 16666 | | APPROVED | YES | SM | YES | BLYDEN | 44 | 25 | 25 | 98 |
| 16672 | | APPROVED | YES | SM | YES | BLYDEN | 45 | 25 | 25 | 100 |

FIG. 23

TRANSACTION OVERVIEW — 601aa

| NAME | LOCATION | UNITS | LOAN NO | TYPE |
|---|---|---|---|---|
| | | 334 [DETAILS] | 1676461962 | DUS MBS |

PROPERTY INFORMATION

| | | | | | |
|---|---|---|---|---|---|
| NAME | | | PROPERTY ID | 37731 | SERVICER NUMBER 21324 |
| ADDRESS | | | GROUP ID | 20097 | LOAN NUMBER 167646 |
| CITY | ST KS | ZIP 662191100 | YEAR BUILT | 0 | FMIS PROG CODE 10 |
| DETAILS MSA | | | NO OF UNITS | 334 | GL MATRIX CODE DUS MBS |
| HEAT UNKNOWN | ELEVATOR | N | PCT SPRINKLERS | 100% | LOAN STATUS CODE 0 |
| A.C. CENTRAL | CLUBHOUSE | Y | FINANCIALS REQD | YES | RS TYPE CODE S |
| CENTRAL BOILER N | EXERCISE FACILITY | Y | INSPECTION REQD | YES | ACQ. DATE 4/1/2001 |
| ROOF SLANT PITCHED | SWIMMING POOL | Y | FIN REPORT QRTY | NO | LPI DATE 9/1/2003 |
| ROOF TYPE SHINGLE | PLAYGROUND | N | SENIORS | NO | YIELD MAINT DATE 9/30/2010 |
| SIDING WOOD | STORAGE AREA | Y | | | MATURITY DATE 4/1/2011 |
| SMOKE DETECTOR | BALCONIES/PATIO | Y | | | |

[ACTION PLAN/WATCHLIST] [COMMENTS] [KEY PARTIES] [LOAN RATING] [PERFORM MANUAL RUN] [FINANCIALS] [INSPECTIONS]
250        252         254          256

CREDIT SERVICES

| FUNCTION | LOAN NO | STARTED/FINISHED | STATUS |
|---|---|---|---|
| | | | |

FIG. 24

| SECTION | SECTION WEIGHTING | SYSTEM RATING | ASSET MANAGER GRADES | | SYSTEM GENERATED COMMENTS |
|---|---|---|---|---|---|
| OPERATIONS | 20% | 31 | 31 | ▶ R | |
| DEBT COV | 20% | 25 | 25 | ▶ R | |
| PROPERTY | 10% | 100 | 100 | ▶ R | |
| CURRENT LTV | 15% | 50 | 50 | ▶ R | |
| MARKET | 15% | 25 | 25 | ▶ R | |
| REFI RISK | 5% | 100 | 100 | ▶ R | |
| PROP MGMT | 10% | 75 | 75 | ▶ R | |
| CUSTOMER | 5% | 58 | 58 | ▶ R | |
| NET CHANGE | | | 0 | | |
| PROP MGMT | 10% | 75 | 75 | ▶ R | |
| CUSTOMER | 5% | 58 | 58 | ▶ R | |
| OVERALL | 100% | 48 | 48 | ▶ R | |
| NET CHANGE | | | 0 | | |

TRIPS

| CATEGORY | FLAGS | FOLLOW UP | AUTHOR | ADDED ON | LAST MOD DT |
|---|---|---|---|---|---|
| DSCR | DEBT COVERAGE RATIO < 1.05 | WILL FOLLOW UP ▶ | MARTHA FRUEH | 6/9/2003 | 10/21/2003 |

ACTION PLAN / WATCHLIST | COMMENTS | KEY PARTIES | LOAN RATING | PERFORM MANUAL RUN | FINANCIALS | INSPECTIONS

LOAN NUMBER: 166527  PROPERTY SEQ: 001  NAM: _____

AM SCORE: 46  ASSET MGR RATING: DOUBTFUL  PROPOSED RTG: DOUBTFUL ▼  WATCHLIST REASON: F, P ▼

DATE ADDED: 9/30/2003  COMMENTS: NEG WITH RESULTED IN COLLECTION OF $150K FOR NEEDED REPAIRS. MONITORING REP 9/30/03.

DATE CLOSED: _____

☑ ON LENDER'S WATCHLIST?   LENDER RATING: _____   LENDER COMMENTS: _____

LOSS FORECAST

| | | |
|---|---|---|
| PROBABILITY OF DEFAULT | 100% | |
| PROBABILITY OF LOSS | 100% | |
| VALUATION METHOD | | TOTAL POTENTIAL LOSS |
| ☐ DIRECT CAP ☐ MAI ☐ OTHER ☐ DCF | | ORIGINAL PLAN $470,000 |
| VALUE | | ACTUAL PROJECTED $449,537 |
| PROPERTY VALUE | $2,100,000 | LENDER LOSS SHARING $200,000 |
| ADD'L COLLATERAL | $0 | FANNIE MAE LOSS $249,537 |
| | | FANNIE MAE WEIGHTED LOSS $249,537 |
| | | TIMING OF LOSS Q1-04 ▼ |

LAST MODIFIED BY:
- ASSET MANAGER — SUBMIT FOR APPROVAL
- TEAM LEADER — APPROVE ACTION PLAN
- DIRECTOR — APPROVE ACTION PLAN
- VICE PRESIDENT — APPROVE ACTION PLAN
- LEGAL — APPROVE ACTION PLAN

ACTION PLAN: _____

ISSUES: _____

601cc

PROPERTY INVESTMENT RATING SYSTEM AND METHOD

CROSS REFERENCE TO RELATED APPLICATIONS

This application is a Continuation of U.S. application Ser. No. 11/026,433, filed Dec. 30, 2004, incorporated herein by reference in its entirety, which claims priority from Provisional Application No. 60/533,566, filed Dec. 31, 2003, incorporated herein by reference in its entirety and which claims priority from Provisional Application No. 60/533,548, filed Dec. 31, 2003, incorporated herein by reference in its entirety.

This application is related to "System and Method for Managing Data Pertaining to a Plurality of Financial Assets for Multifamily and Housing Developments" U.S. application Ser. No. 11/026,102, filed Dec. 30, 2004, and hereby incorporated by reference.

BACKGROUND

The present invention relates generally to property investment rating systems and methods. More specifically, the present invention relates to a system and method for managing a large portfolio of property-related investments or potential investments based on pre-determined criteria such as risk and financial performance.

Multifamily housing refers to housing that is subdivided into five or more independent units. Each unit is configured to house a person or a group of people, herein referred to as residents. The number of units in a multifamily housing property can vary from a relatively small number of units to a relatively large number of units.

Often, the residents of a unit in a multifamily property are not the owners of the individual unit or the multifamily property. The residents of the unit pay rent to the owner of the multifamily property for the right to reside in the unit. The rent provides a stream of income to the owner of a multifamily property. The amount of income is the aggregate of the rent received from each of the residents in the multifamily property such as parking fees, laundry fees, retail space rental, and/or various subsidies.

Because the amount of money involved in purchasing multifamily property is often high, most potential purchasers do not purchase the multifamily housing property outright. Rather, the potential purchasers obtain financing, e.g., in the form of debt, equity or bond investments from investors. Investors in such financing arrangements may develop large portfolios of investments in multifamily housing. Managing these portfolios can become difficult for the investor as the total number of loans and/or the total dollar amount of the loans increases. In order to allow investors to manage their investments, it is desirable for investors to have tools to help monitor such things as the property financials, property condition, markets, etc. for the underlying properties.

Accordingly, it would be advantageous to provide a system that provides tools for monitoring the performance of a portfolio of investment properties. It would also be advantageous to provide a system that provides an intuitive rating system for characterizing property related investments. It would also be advantageous to provide an automated system to evaluate potential investments in properties.

It would be advantageous to provide an investment rating system or the like of a type disclosed in the present application that provides any one or more of the these or other advantageous features. It should be understood, however, that the systems/methods disclosed herein may also be used to achieve different and/or additional advantages, without necessarily achieving the advantages described herein.

SUMMARY

One embodiment relates to a multifamily investment management tool which comprises user interface logic and an investment rating engine. The user interface logic is configured to provide a user interface accessible to a user and includes risk profile configuration interface logic configured to permit a user to define a plurality of different risk profiles for a plurality of different investments. The investment rating engine is coupled to the user interface logic and is configured to evaluate the plurality of different investments according to the plurality of different risk profiles.

Another embodiment relates to a multifamily investment management tool which comprises risk profile configuration interface logic, an investment rating engine, and workflow management interface logic. The risk profile configuration interface logic is configured to permit a user to define a plurality of different risk profiles for a plurality of different investments. The investment rating engine is coupled to the user interface logic and is configured to evaluate the plurality of different investments according to the plurality of different risk profiles. The workflow management interface logic is configured to receive output of the investment rating engine and is configured for use by an asset manager to manage workflow of the asset manager.

BRIEF DESCRIPTION OF THE DRAWINGS

FIGS. 4-26 show display screens provided by a user interface for the system according to exemplary embodiments.

DETAILED DESCRIPTION OF THE EXEMPLARY EMBODIMENTS

According to an exemplary embodiment, an investment rating system and method are provided to help or assist an individual and/or an organization (e.g., an investor) monitor or rate investments based on pre-defined criteria. Various data relating to investments and/or properties (such as property condition details, customer ratings, loan details, property financials, in the case of mortgage loans) may be collected and evaluated according to risk analysis profiles which may be configurable according to the nature of the risks associated with a particular investment. The data may be used to generate an overall evaluation of risk associated with an investment and/or to generate flags or trips associated with specific issues that raise concern. In the exemplary embodiment, the investment rating system and method may be used to help manage the workflow of asset managers and may be used to help asset managers prioritize their asset management and loss mitigation activities by identifying those properties that are at a greater risk for default. Additionally, the investment rating system may also generate investment rating output scores or values which may be reviewed by an asset manager and provided to other modeling systems (e.g., for early warning, loss forecasting, and so on).

Figure 1:
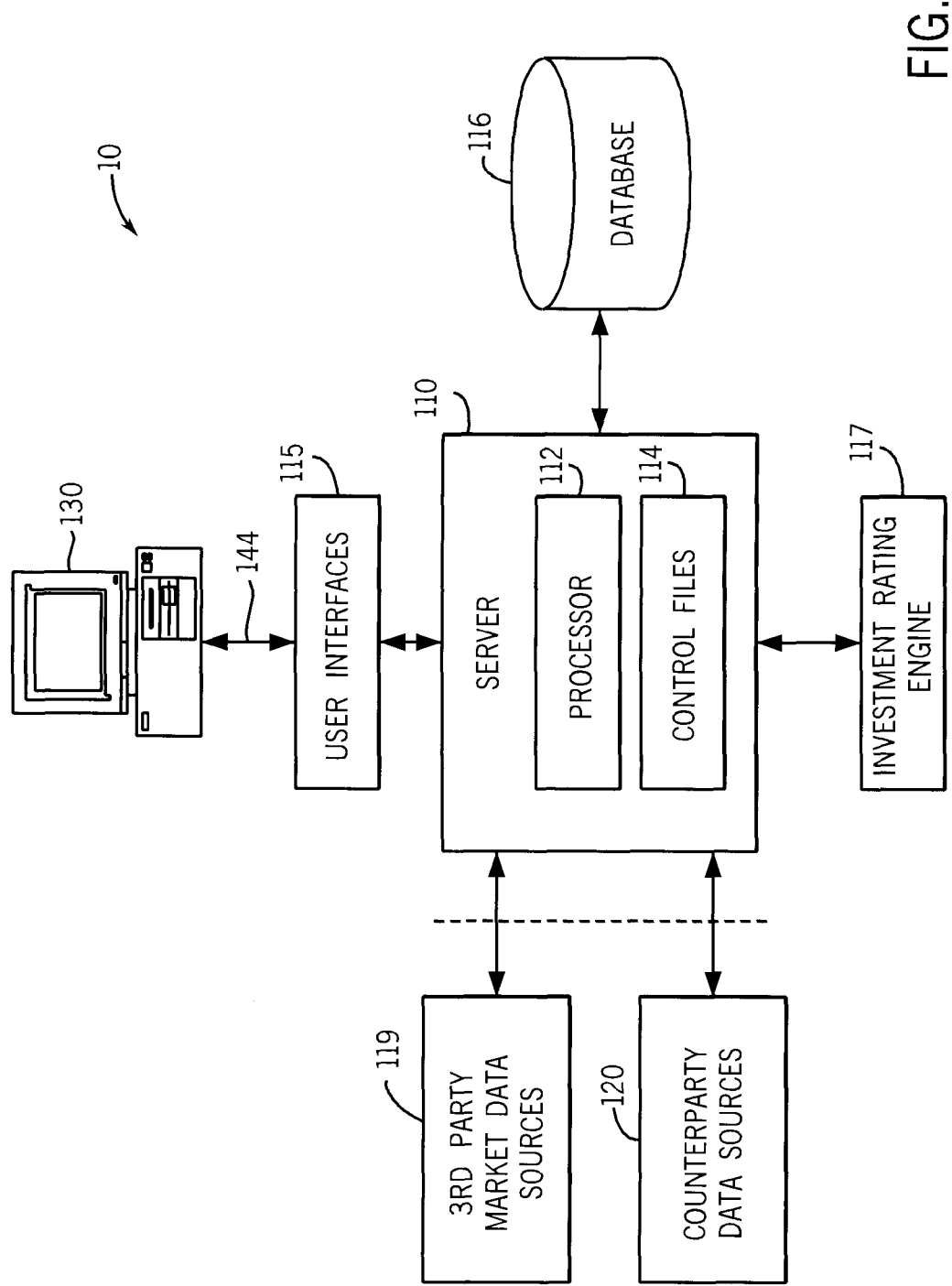
FIG. 1 is a schematic representation of an investment rating system for processing investments according to an exemplary embodiment.

Shown in FIG. 1 is a simplified schematic illustration of a system 10 useable to implement an exemplary embodiment of an investment rating system and method. System 10 may utilize various computer capabilities, hardware, software, electronic communications links, etc. System 10 includes a computer server 110 having a processor 112. Server 110 operates under the control of computer software shown as control files 114. Server 110 is coupled to database 116 which may be used to store, among other data, records relating to a number of different investments.

Server 110 is configured to be electronically coupled to user interface logic 115. User interface logic 115 may be accessed by one or more different types of users (e.g., authorized business users, asset managers, credit policy specialists, etc.). User interface logic 115 preferably provides linked interactive display screens to such users using conventional input and display devices such as one or more desktop computers, laptop computers, and/or other computers 130 via electronic links. User interface logic 115 is configured to allow a user to access to the investment rating engine 117 and the database 116 storing financial performance and other information pertinent to the investments. User interface logic 115 may be implemented using a data base program (e.g., Microsoft Access), an Internet-enabled web-type interface, other commercially available user interface technologies, or other arrangements. According to various embodiments, different user interfaces may be provided and system 10 may be accessed as part of a larger system.

According to one exemplary embodiment, server 110 may execute an investment rating engine 117 to monitor an investment portfolio. The investment rating engine 117 may be executed on a single server (shown as server 110) or on separate logical servers or using separate physical devices. Although the investment rating engine 117 is shown as being separate from the server 110 and the computer 130, it will be appreciated that the investment rating engine (and the user interface logic) may be implemented by the server 110 (including the control files 114) and/or by the computer 130. Likewise, although the financial performance and related information is shown as being stored in the database 116, it will be appreciated that this information could be stored elsewhere (e.g., computer 130) in addition to or instead of the database 116. According to alternative embodiments, other engines may be provided that provide other functionality.

In addition to storing the financial performance and other data pertinent to the investments, the database 116 also stores parameters used to configure different risk profiles for different investments or categories of investments. Different risk profiles may be created to more accurately reflect the risk characteristics associated with a particular investment. For example, according to a preferred embodiment, a scoring system may be used in which the weighting for different categories and subcategories is defined based on perceived contribution to overall risk provided by each category/subcategory for that investment. Additionally, different risk profiles may have different ranges such that the interpretation of a given value may vary for different investments (e.g., for the same parameter, the range of values that is considered "acceptable" or low risk may be defined differently for different investments). Further, different risk profiles may be created with different trip settings, so that trips occur under different pre-defined scenarios for different investments or categories of investments. Other mechanisms for configuring risk profiles may also be employed.

I. Process Flow

Figure 2:
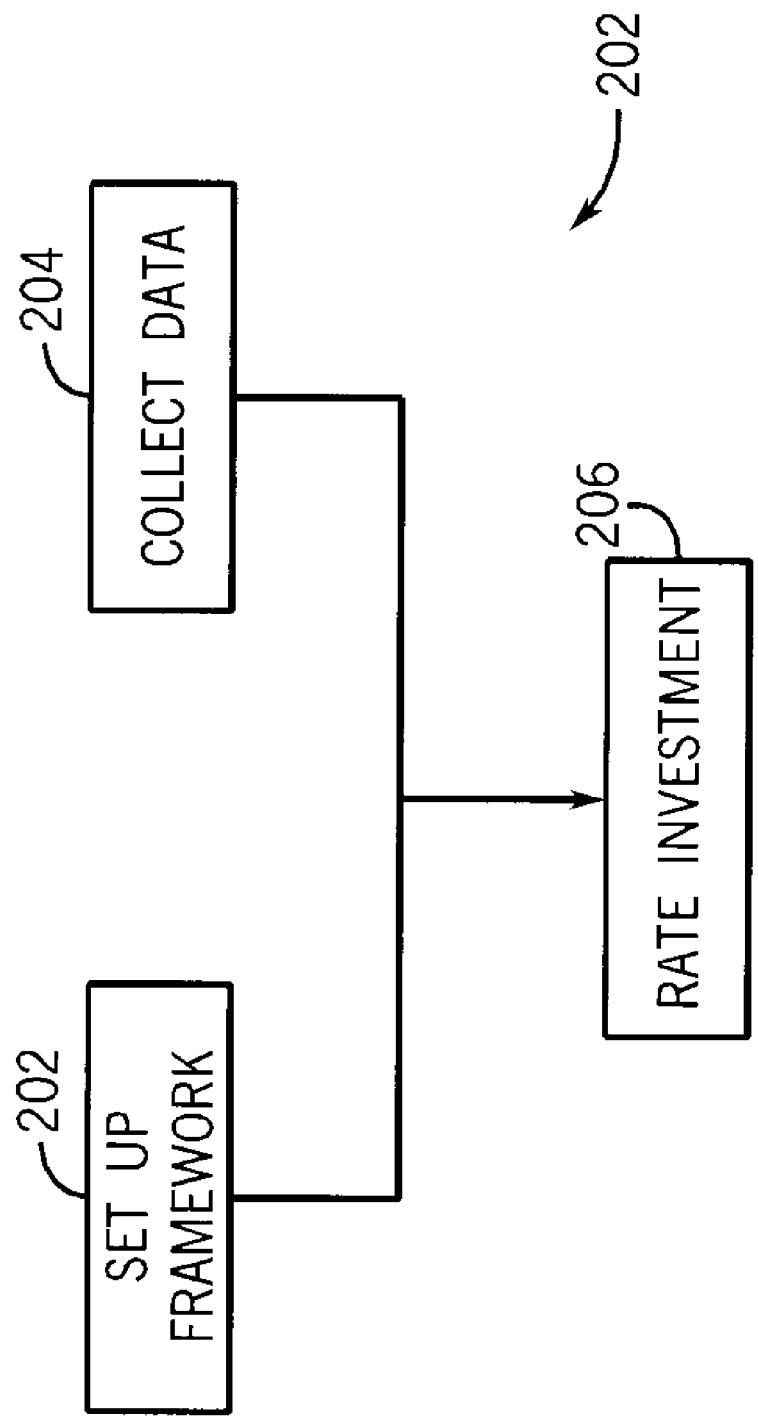
FIG. 2 is a flow chart depicting an investment rating process according to an exemplary embodiment.

Referring to FIG. 2, the investment rating engine 117 follows an overall process 200. The process 200 includes, at step 202, storing a risk analysis framework for use in evaluating financial performance data and other information. As previously noted, and as will be described in greater detail below, different risk profiles may be used which are configured to reflect the risk characteristics of different investments. In the exemplary embodiment, the different risk profiles are configured responsive to operator inputs received in connection with screen displays shown in FIGS. 4-26, as described below.

At step 204, various data is collected that is used by the investment rating engine 117 to evaluate investments. The data may be collected from a variety of sources. For example, the data may be collected from a counterparty data source, such as a computer system associated with a lender or property owner that electronically provides financial performance information on a regular basis (e.g., annually, quarterly, or monthly). The data may also be collected from 3rd party market data sources, such as one or more computer systems that provide information regarding property values for different geographic markets. The data may also be collected from internal systems, such as computer systems associated with asset managers that visit properties associated with individual investments and provide/update data used by the investment rating engine 117 to evaluate such investments.

In general, the data that is collected facilitates evaluating different types of risk that may be encountered. For example, financial performance data provides an indication of the financial health of a given property and the likelihood of default. Other data is preferably also collected. For example, it may be determined that the risk associated with a particular investment is likely to increase to the extent that the value of the property (or properties) serving as collateral for the investment decreases. That is, if the property value decreases, the investor's risk may increase because the investor may be less able to recover its investment from sale of the property in the event of foreclosure. Accordingly, data may be collected that is useable to assess property values of properties underlying individual investments. The disclosed data is merely exemplary of the types of data that may be collected and used and other types of data targeted towards evaluating other sources of risk may also be collected and used, depending on what risks are identified, what risks are considered important, what risks have associated data that can be collected in a practical manner, and so on. For example, it may be desirable to obtain credit information (e.g., Dun & Bradstreet, Moody's, etc.) for the property owner and/or the lender, so that the credit quality of the lender or property owner may be taken into account.

At step 206, the investments are evaluated based on the risk analysis framework and the collected data. As previously indicated, the investment rating engine 117 may generate an overall evaluation of risk associated with an investment and/or generate flags or trips associated with specific issues that raise concern. In the exemplary embodiment, the investment rating engine 117 generates both an overall score and trips. An asset manager may then review the data that went into generating the score, review the trips, and provide operator inputs to modify the system-generated overall score upwardly or downwardly as deemed necessary. In this arrangement, it is assumed that the asset manager may have more complete information than the system 10 inasmuch as, for troubled properties, the asset manager is likely to be in direct and frequent contact with the property owner. Alternatively, the asset manager may be able to detect limitations in the data available to the investment rating engine 117 or the rating methodology used by the investment rating engine 117 that are causing the investment rating engine to provide an inaccurate score.

For example, the asset manager may determine that the system-generated score is too high because it does not adequately reflect the risk associated with a trip that occurred. Alternatively, the asset manager may decide that the system-generated score is too low due to an anomaly in the data, e.g., the investment is being overly penalized for missing data. Alternatively, the asset manager may simply determine that the system-generated score is accurate. Once an overall score has been generated and approved by the asset manager (with or without modification), this score may then be provided as an output to other systems for loss forecasting, early warning analysis, and so on.

In one embodiment, a risk profile identification is stored for each investment. When the investment rating engine 117 is executed to generate scores for a particular risk profile, the investment rating engine 117 ascertains which investments are to be rated according to the particular risk profile and generates scores for those investments. According to other embodiments, multiple scores may be generated using multiple risk profiles for each investment. In this arrangement, an investment having two different risk profiles and debt coverage ratio profiles will not be treated in the same way by the investment rating engine 117. Instead, the investment is considered as two different entities producing different sets of scores.

The investment rating engine 117 may also be used to provide a workflow management tool for asset managers of the investor. The investment rating engine may be used by asset managers to help them prioritize their asset management and loss mitigation activities by identifying those properties that are at a greater risk for default. For example, as detailed below, if the system-generated score is below a pre-determined level, the asset manager may be required to review the investment level data for the investment with the low score. Additionally, the asset manager may be required to review the investment level data in connection with any trips that occur. The output of the investment rating engine 117 may also be used to generate a list of tasks to be performed by an asset manager in connection with a troubled investment.

According to an exemplary embodiment, the investment rating engine 117 may evaluate investments on an ongoing basis, either automatically or responsive to user inputs. For example, the investment rating engine 117 may be run for each of the following events: (1) a pre-defined risk analysis profile has been changed (e.g., changes to the weighting, category or subcategory classification, scale, etc.) and an investment needs to be rated based on the changed framework; (2) investment details or other data have been updated in a data repository (e.g., updated financial performance information is received for one or more investment properties); and (3) other enhancements to the investment rating engine 117 have been implemented. For example, the investment rating engine 117 may be run on a periodic basis (e.g., monthly, quarterly, yearly, etc.) when results from a particular investment are received. Each time the rating engine runs, a new set of scores are obtained. The date and time are stamped on the data each time the engine runs to generate a new set of scores. Old data is retained so that the history of how an investment was rated by the investment rating engine 117 over time may be viewed, e.g., to assess performance of the investment rating engine 117 and asset managers in connection with investments that ultimately failed and implement improvements/modifications to the investment rating engine 117 or practices of asset managers as deemed necessary.

It may also be noted that the steps 202-206 need not be performed in any particular order. For example, steps 202-206 may be performed iteratively throughout the life of an investment. For example, several years into an investment, it may be determined that the risk profile used to evaluate the investment (step 206) does not accurately characterize a particular source of risk. Accordingly, based on this feedback, the risk profile may be modified (step 202) and used in combination with new and/or previously collected data (step 204) to perform more accurate evaluations.

Although a number of features have been mentioned above and further features are mentioned below, it should be noted that it is possible to implement the system 10 in such a manner that only some of these features are included. Additional, different, or fewer features may also be included.

II. Operator Interface

Referring to FIGS. 3-26, a preferred embodiment of user interface logic 115 as well as additional details regarding operation of the investment rating engine 117 will now be described. User interface logic 115 is configured to provide a series of linked interactive screens which allow for the acquisition and display of data relating to one or more multi-family housing investments. According to an alternative embodiment, other programs or graphical user interfaces which allow user interaction, data entry and user commands may be used. It should be noted at the outset that the arrangement, order and configuration of the user interface including various screens may be altered, changed or otherwise varied.

Figure 3:
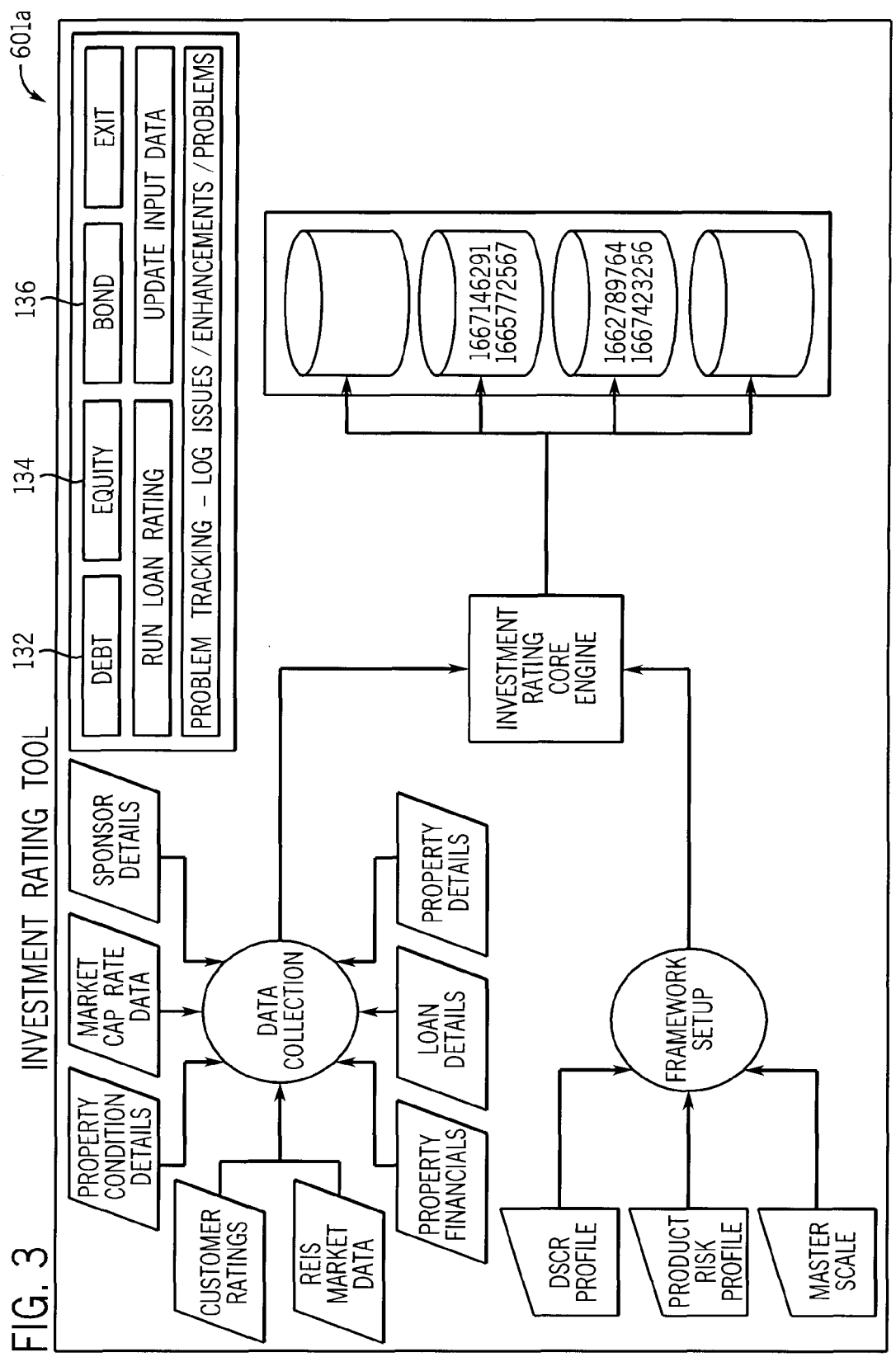
FIG. 3 shows a display screen provided by a user interface for the system according to an exemplary embodiment.

FIGS. 3-26 show different screens displayed to an operator by the user interface logic 115. FIG. 3 depicts an introductory screen 601a which includes buttons 130-134 which allow the user to access different aspects of the investment rating engine 117 associated with different types of investments, including debt investments (button 130), equity investments (button 132) and bond investments (button 134). As previously noted, the investment rating engine 117 preferably may be used in connection with each of these different types of investments. For example, by pressing the debt button 132 (e.g., using a mouse or other suitable operator input device), the user may perform various activities in connection with debt investments, adjust risk analysis profiles, create new profiles, view results of analysis performed by the investment rating engine 117, access financial performance and other data for debt investments, and so on. Likewise, by pressing the equity button 134 or the bond button 136, the user may access the same or similar functionality for equity investments or bond investments. For simplicity, the remainder of this disclosure will focus on debt-based investments; however, it should be noted that equity-based and bond-based investments may be implemented in the same or similar manner.

A. Framework Setup Interface

Figure 4:
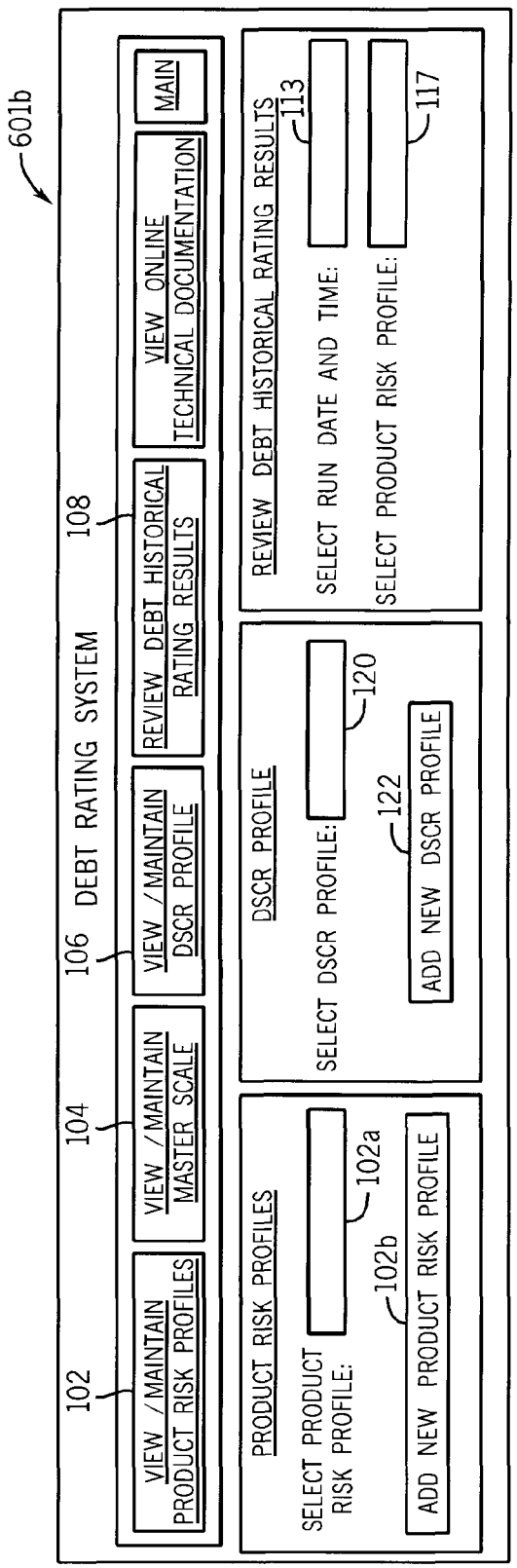

In general, to set up the framework or to view results of financial analysis performed by the rating engine 117 for rating a debt-based investment, a user first selects the debt button 130 on the screen 601a shown in FIG. 3. The user is then taken to screen 601b shown in FIG. 4. FIG. 4 shows a screen 601b where a user may make selections including view/maintain product risk profiles (button 102), view/maintain the master scale (button 104), view/maintain the debt service coverage ratio (DSCR) profile (button 106), and review debt historical rating results (button 108).

Figure 5:
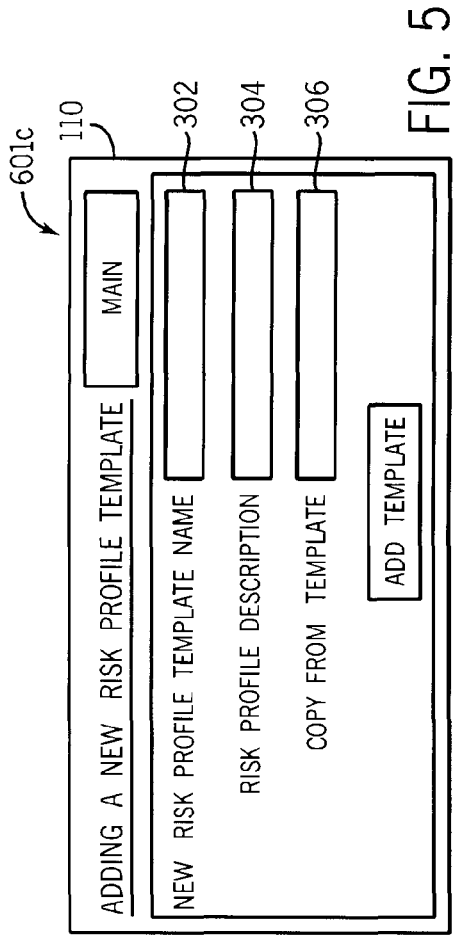

For example, if the user selects button 102 to view/maintain product profiles, then field 102a and button 102b become active and allow the user to view an existing risk profile or to add new risk profile. By making a selection to add a new product risk profile (button 102b), a user is taken to screen 601c shown in FIG. 5. Referring to FIG. 5, screen 601c is shown according to an exemplary embodiment. Screen 601c provides an interface for receiving information to add a new risk profile template. A new risk profile template is added by providing a field to receive a user-specified name for the new risk profile template (field 302), a field to receive a user-specified description for the new risk profile template (field 304), and a field to receive a name of existing template which is to serve as a base for developing the new template (field 306). Each new risk profile template that is created may be based on an existing risk profile template. Any changes made to the existing or the newly created risk profile template are stored in a data store (e.g., database 116 shown in FIG. 1).

Figure 6:
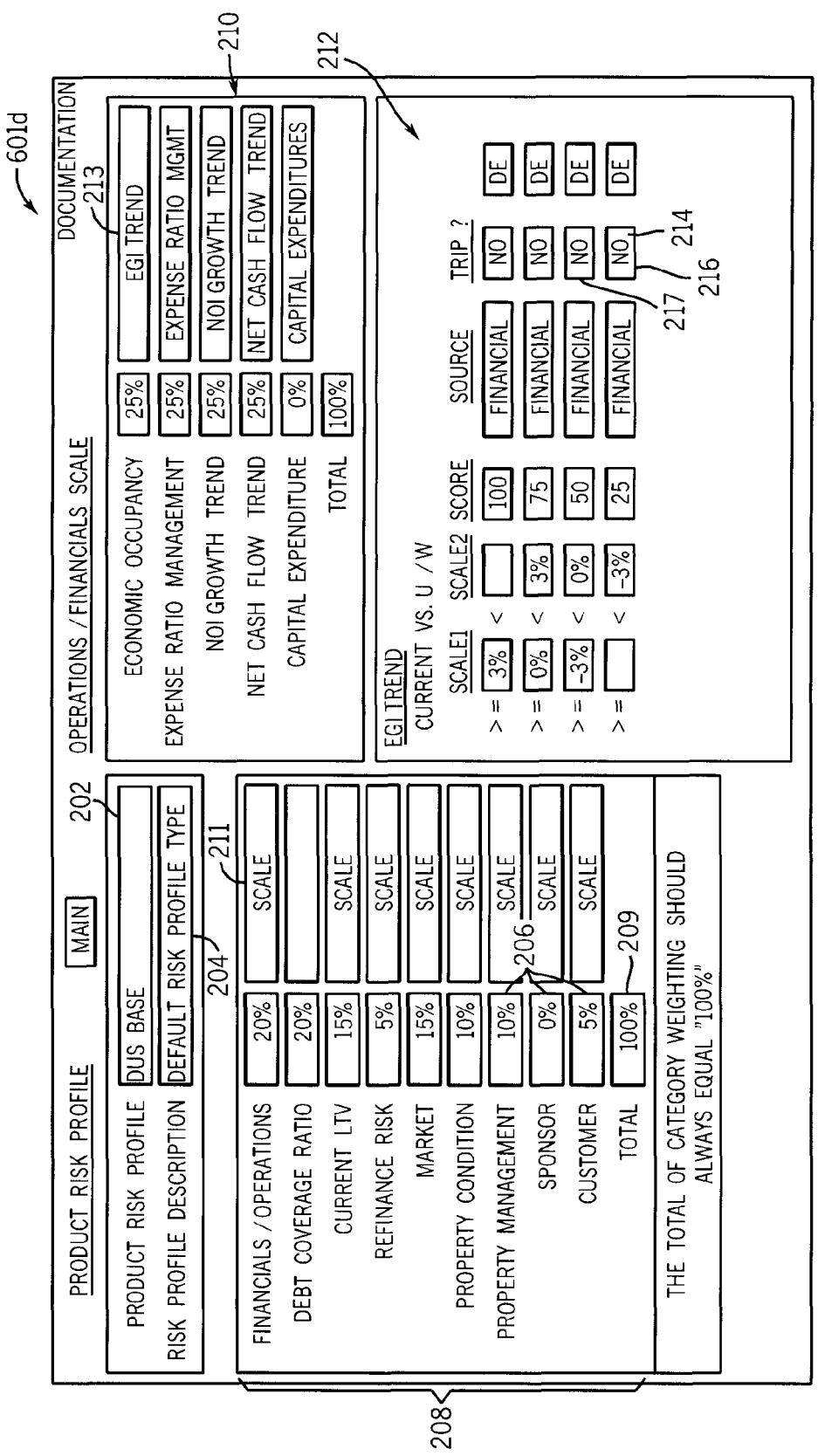

FIG. 6 shows screen 601d which illustrates an example of a product risk profile. A screen such as screen 601d may be shown when viewing/modifying an existing profile or when creating a new risk profile based on an existing profile. Screen 601d shows a product risk profile which has been named "DUS Base" as indicated in field 202 and which has been described as "Default Risk Profile Type" in field 204.

Screen 601d displays the weighting values in fields 206 applied to various defined categories of data 208 used to create the risk profile. The categories of data relate to different types of risk that is encountered for each investment. The categories include financials/operations, debt coverage ratio, current loan-to-value (LTV), refinance risk, market, property condition, property management, sponsor, and customer. To produce the overall system-generated score for a particular investment based on a particular risk profile, a score is generated for each of the categories 208, and the overall system-generated score is calculated as the combination (e.g., weighted average) of the scores for the categories 208 weighted in accordance with the weighting values in fields 206.

A user may update or modify the category weighting preferences in fields 206 as applicable to the particular investment (or investment class or subclass for which the risk analysis profile is being created). Specifically, by entering a new number in a field 206, the weighting given to a particular category of financial performance data (e.g., "financial/operations") may be modified. Accordingly, any number of different risk profiles may be constructed each having different weightings in fields 206 for the various categories 208. Any change that is made to the weighting is stored in the data store (e.g., database 116 shown in FIG. 1). Each category may potentially receive a different rating in field 206 but the total weighting for all of the categories sums to 100% as shown in field 209. According to an exemplary embodiment, the system 10 is configured to automatically ensure that the total of all category weighting equals 100% (field 209). To the extent that there is any discrepancy in the data entry (e.g., deviation from a category weighting total of 100%), the system 10 preferably prevents the user from proceeding until the weighting distribution is corrected.

A column of buttons 211 is provided that are each labeled "Scale" and that are placed in line with the categories 208. The buttons 211 are respectively associated with the categories 208. By pressing a respective button 211, a user may drill down on any of the categories 208 to modify the manner in which a score is generated for a particular category. In FIG. 6, the user has pressed the button 211 associated with the financials/operations category 208, and so additional information is provided on the right side of screen 601d regarding the manner in which the score for the financials/operations category 208 is generated.

Window 210 in screen 601d indicates that the financials/operations score is generated based on a number of subcategories, including economic occupancy, expense ratio management, NOI growth trend, net cash flow trend, and capital expenditure. To produce the financial/operations score, a score is generated for each of the subcategories shown in window 210, and the financial/operations score is calculated as the combination (e.g., weighted average) of the scores for the subcategories weighted in accordance with the weighting values shown in window 210. In one embodiment, the various scores for the subcategories are calculated first (e.g., by separate computational modules), and then used (e.g., by an additional computation module) to generate the overall score for the investment. It will appreciated that additional scores for additional subcategories may be calculated, allowing as much data to be taken into account in the rating process as desired. The subcategories allow various types of data within a given category to be taken into account in the rating process, and thereby provide additional depth and granularity to the rating process and ultimately increase the accuracy for rating an investment.

The user may again adjust the weightings to the various subcategories set forth in window 210. Again, the system 10 preferably operates to ensure that the weightings for the different categories sums to 100%. Again, the weightings for the various subcategories set forth in window 210 may be set different for each risk profile that is created.

A user may select any of the subcategories within window 210 for a more detailed view of the manner in which the score is generated for that particular subcategory. For example, window 212, which is provided in response to user-selection of button 213, shows the manner in which a score is generated for the EGI Trend category in greater detail. It will be appreciated that additional information regarding the manner in which a score is generated for the other subcategories (expense ratio management, NOI growth trend, net cash flow trend, and capital expenditure) is depicted if other ones of the buttons shown in window 212 are pressed. As shown in window 212, the EGI Trend is assigned a score of 25, 50, 75, or 100 depending on how current occupancy compares to what was predicted during underwriting.

As shown by fields 214, trips can be set up to flag when a particular category or risk level needs to be analyzed further. For example, in the risk profile set forth in FIG. 6, no trips are set up. If the setting in field 216 is changed from "no" to "yes", then a trip will occur when the investment rating engine 117 runs if the EGI trend drops to a value which results in a score of 25 or less. If it is also desired for the trip to occur when the EGI trend level drops to a level of 50 or below, then the setting in field 217 may be changed from "no" to "yes" as well. Like the weightings for the various categories 208 and the various subcategories shown in window 210, the trips may be configured differently for each risk profile that is created. Whereas the system-generated score provides an overall indication of the risk associated with a particular investment, the trips provide flags regarding more specific issues which may cause an investment to fail. Advantageously, the trips allow such issues to be detected even though the effect of such issues on the overall score may be diluted by the numerous other factors that are used in generating the overall score.

FIGS. 7-14 provide additional examples of screens that may be provided in connection with additional ones of the top-level categories 208 of FIG. 6. Again, the parameters shown in the screens in FIGS. 7-14 may be modified responsive to user inputs to create different weightings, scales, trips, etc., in connection with different risk profiles.

Figure 7:
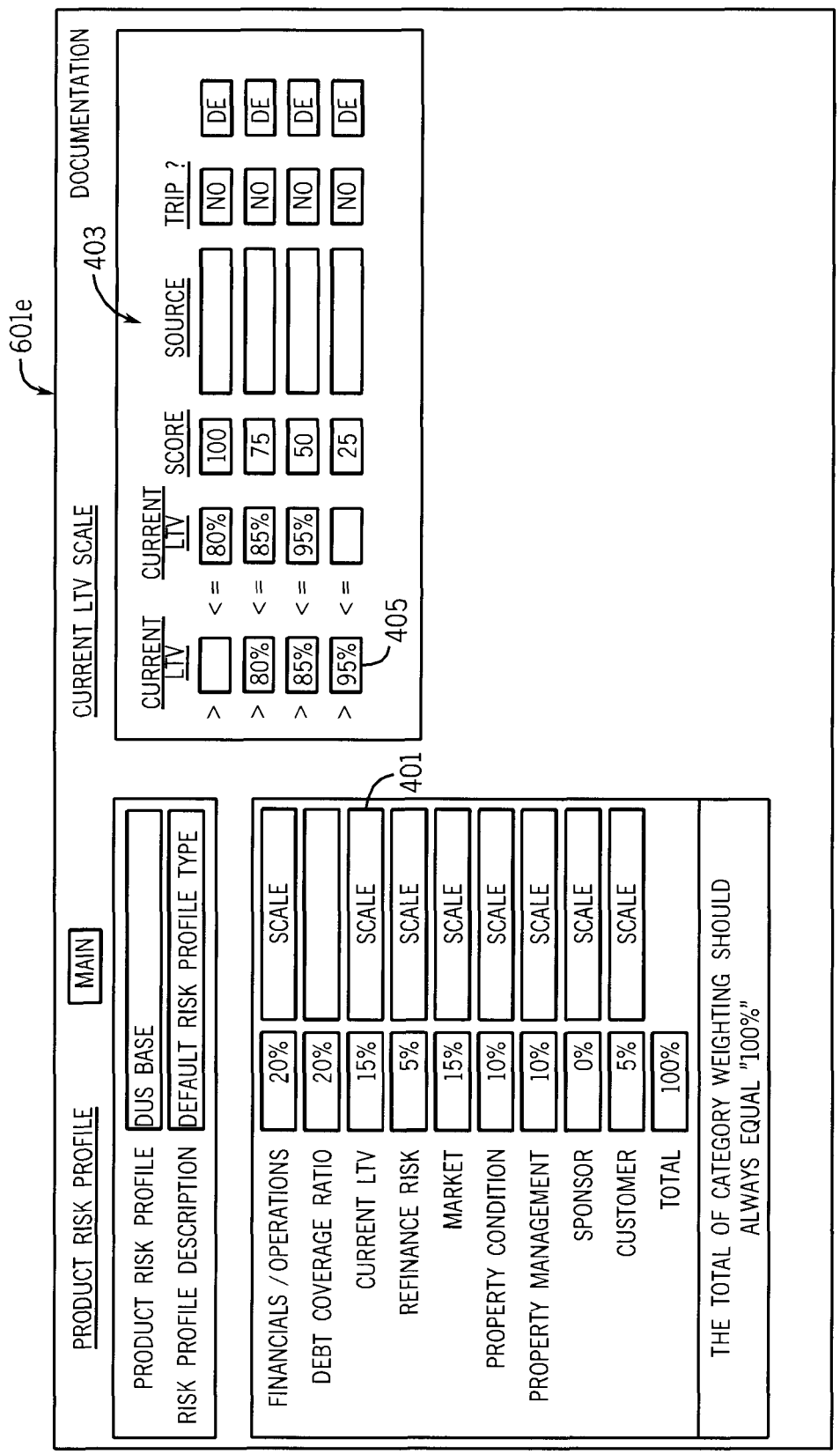

FIG. 7 shows screen 601e which illustrates an example of additional details of the Loan to Value (LTV) category. A user may select the scale button 401 to open a current LTV scale window 403. Once this window box is opened, the user may edit scaling values (fields 405) and configure trip settings as desired. According to what is shown in FIG. 7, the current LTV score is assigned a value of 100 if the LTV is less than or equal to 80%, is assigned a value of 75 if the LTV is greater than 80% but less than or equal to 85%, is assigned a value of 50 if the LTV is greater than 85% but less than or equal to 95%, and is assigned a value of 25 if the LTV is greater than 95%. The system is not configured to generated trips based on an LTV that is too high (each of the trip fields is set to "No"), however, the trip fields could be modified if such trips were desired.

Figure 8:
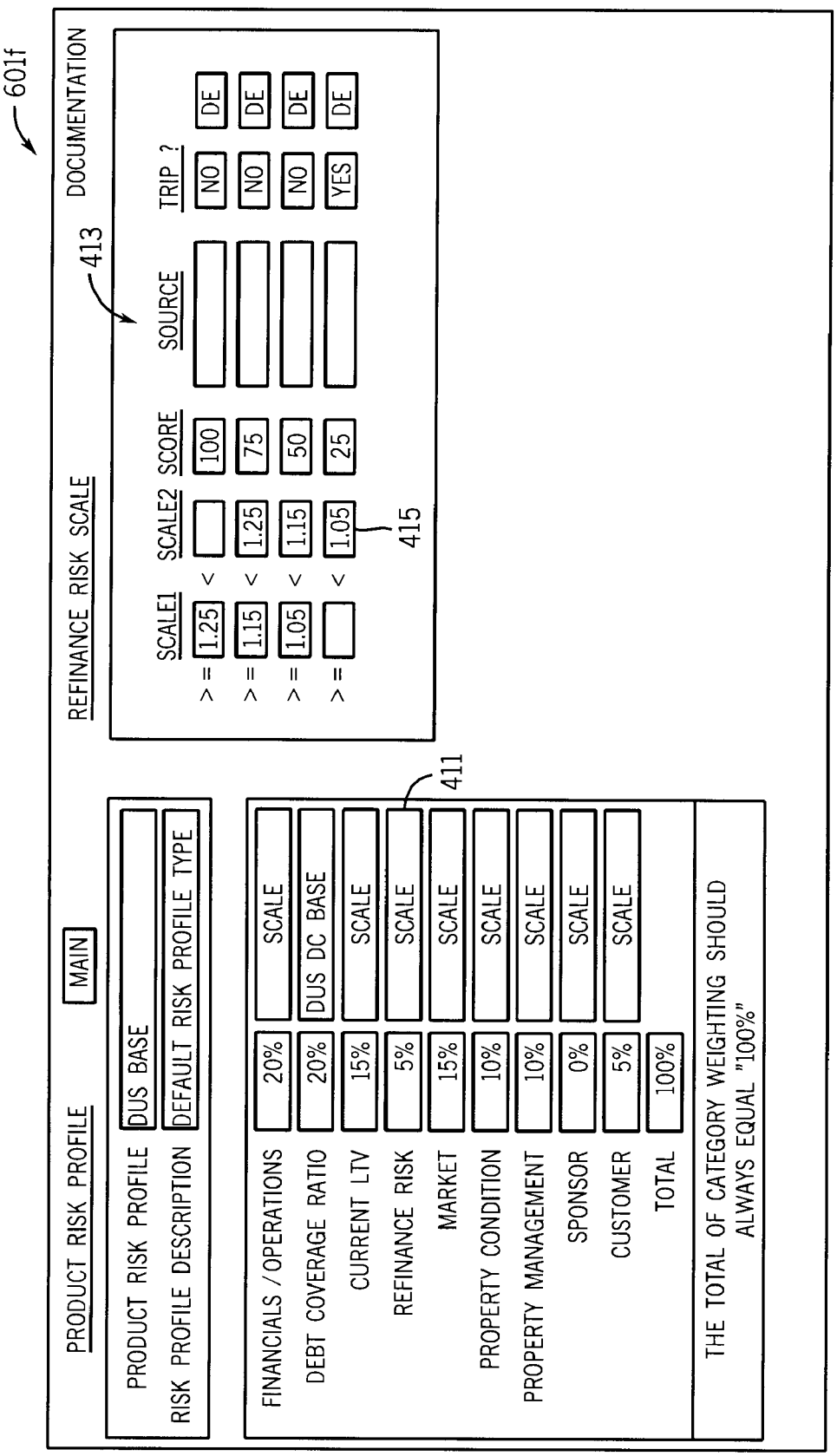

FIG. 8 shows screen 601f which illustrates an example of additional details of the refinance risk category. A user may select the scale button 411 to open the refinance risk scale window 413. Once this window is opened, the user may edit scale settings (fields 415) and configure trip settings as desired.

FIG. 9 shows screen 601g which illustrates an example of additional details of the market category. A user may select the scale button 421 to open the market scale windows 423 and 424. The market scale includes an REIS market data window 423 and a market scoring grid window 424. The window 423 shows scores assigned to various geographic markets by the third party data source. The third party source gives each geographic market a score having one of four values (shown as green, yellow, orange or red). The scoring grid window 424 shows how each of these values is converted to a numeric score (25, 50, 75, or 100). Once the market scale is opened, the user may edit the scale values and configure trip settings in window 424 as desired. It will be appreciated that, although only a small number of geographic markets are shown in FIG. 9, data is preferably received from the third party data source for all geographic markets in which properties underlying the investments under consideration are located.

Figure 10:
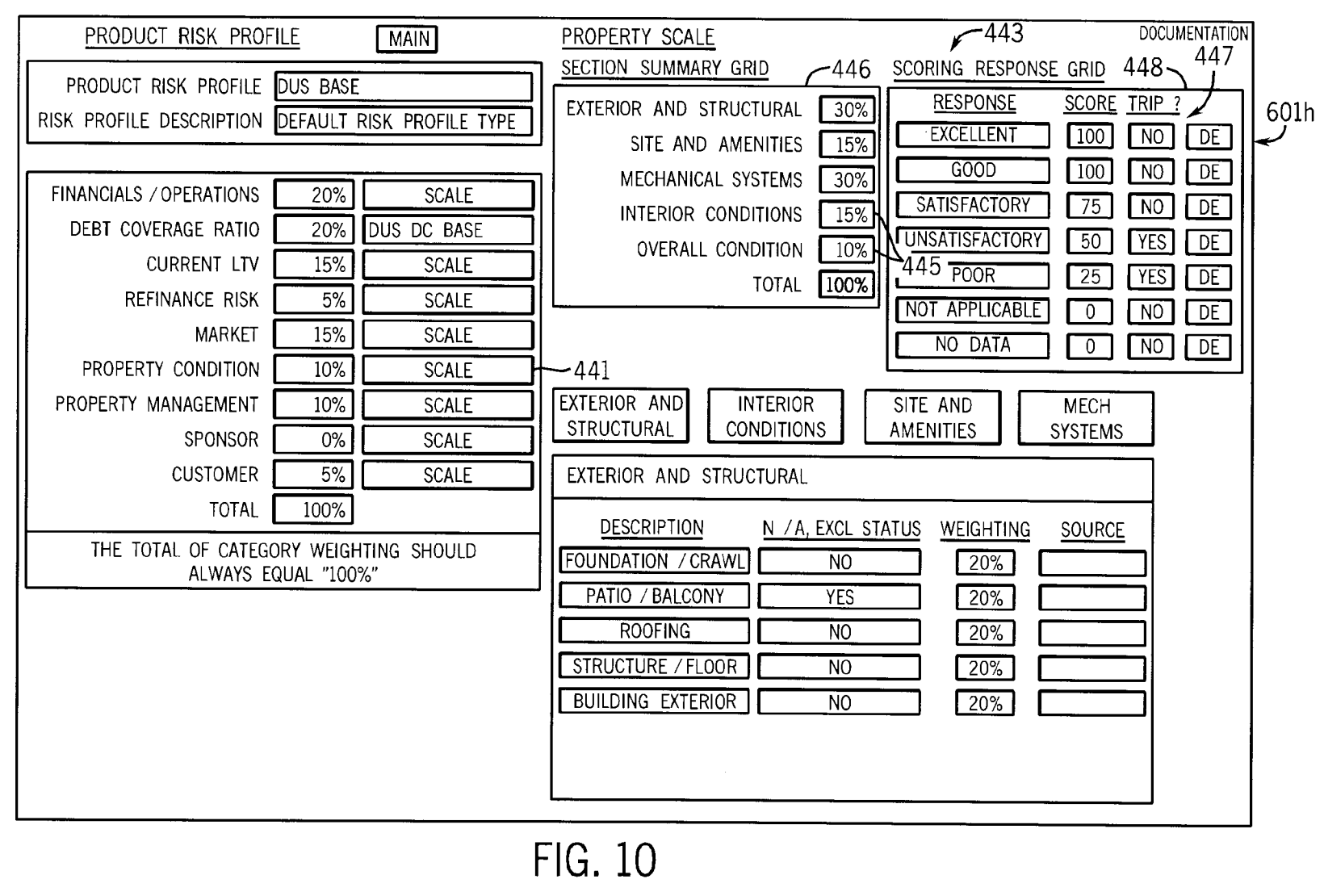

FIG. 10 provide sections of screen 601h which illustrate additional details of the property condition category. A user may select the scale button 441 to open the property scale window (shown as field 443). Once this box is opened, the user may edit the weighting values (fields 445) in the summary section window 446. Summary window 446 indicates subcategories of the property condition category, including an exterior and structural condition, interior conditions, site and amenities, mechanical systems, and overall conditions. In FIG. 10, the user has pressed the exterior and structural button below window 446, and thus the remainder of FIG. 10 show additional details regarding the factors that go into generation of the score for the exterior and structure subcategory. It will be appreciated that, if the user presses one of the other three buttons, additional information regarding the factors that go into generation of the score for one of the other subcategories (interior conditions, site and amenities, mechanical systems, and overall conditions) will be shown. The exterior and structural subcategory may include factors such as foundation/ crawl area, patio/balcony, roofing, structure/floor, building exterior, interior conditions, appliances, common areas, exterior/interior stairs, building interior, etc. The site and amenities subcategory may include factors such as site and amenities, landscaping, parking/paving, recreational facilities, sidewalks, site drainage, site lighting, retaining wall, etc. The mechanical systems subcategory may include factors such as elevators, HVAC, electrical/plumbing, etc.

The data for the property condition category may come from a property inspection. For example, for each of the factors mentioned above, the inspector may assign a score such as excellent, good, satisfactory, unsatisfactory, poor, or not applicable. The scoring response grid shown in window 447 shows how each of the inspector-assigned scores is converted to a numeric value. As also shown in window 447, if the condition is rated as either unsatisfactory or poor, a trip will be generated during execution of the investment rating engine 117.

Figure 11A:
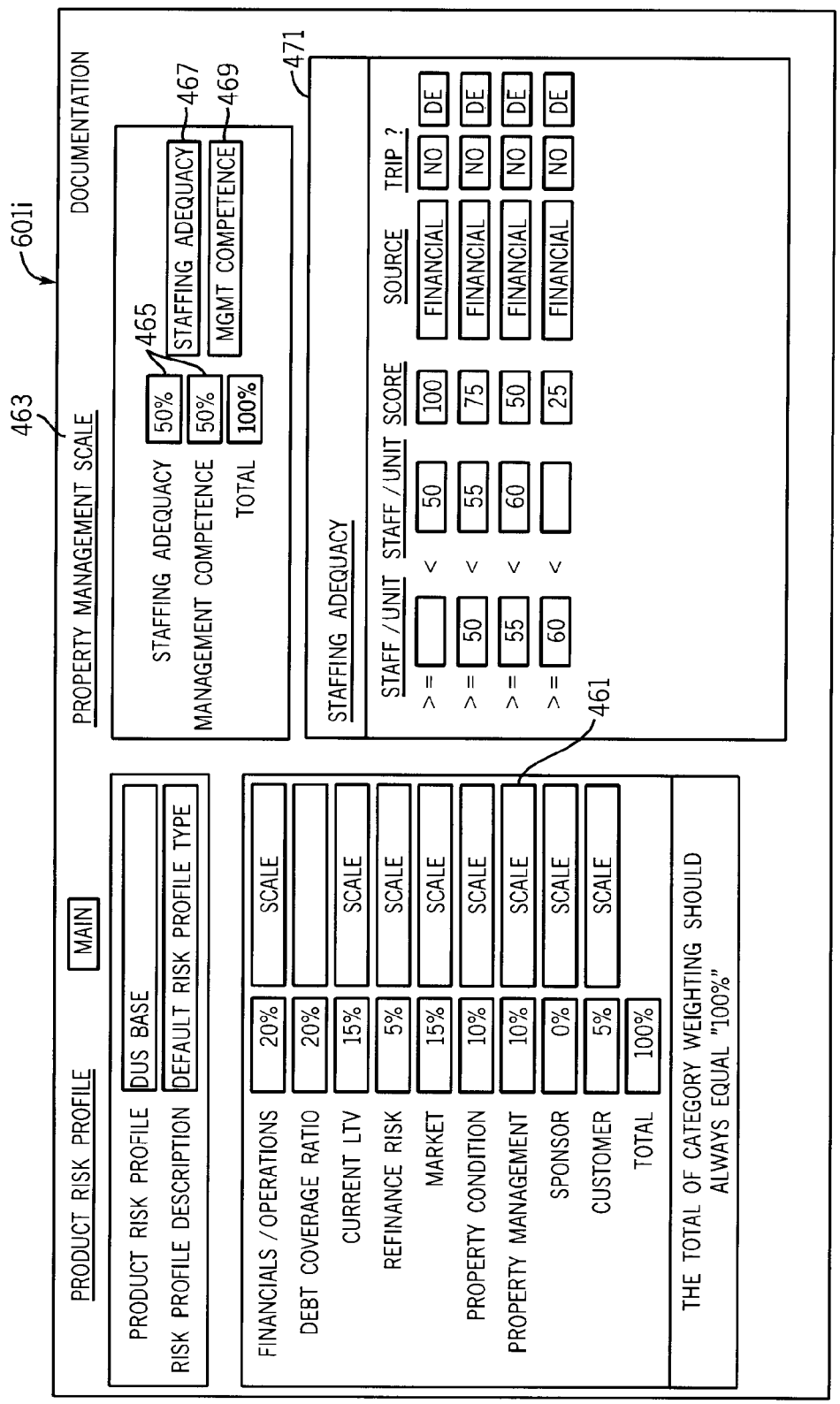
Figure 11B:
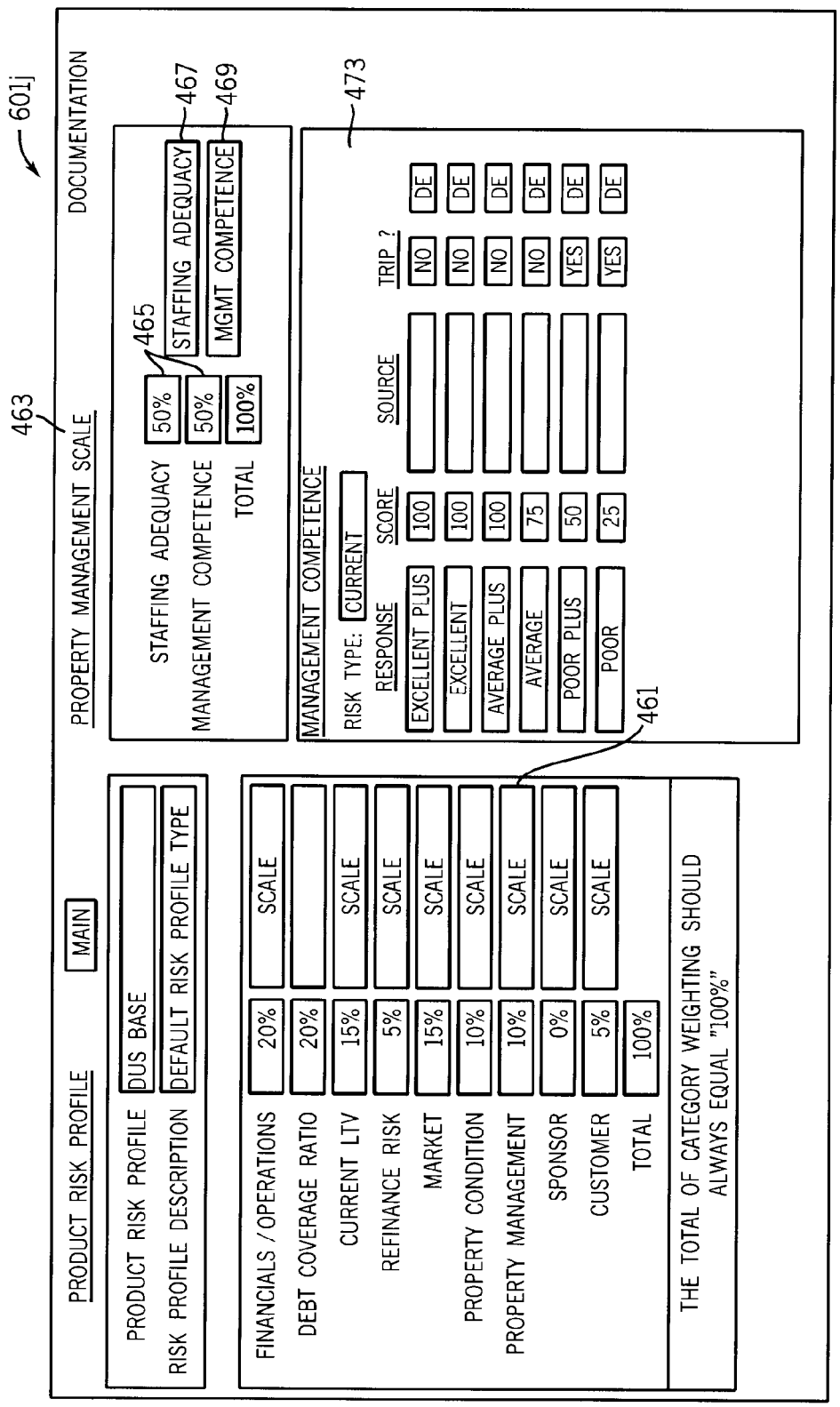

FIGS. 11A and 11B show screens 601i and 601j which illustrate examples of additional details of the property management category. A user may select the scale button 461 to open the current property management scale window 463. Once this box is opened, the user may edit the weighting values (fields 465) and click on individual categories for staffing adequacy (button 467) and management competence (button 469). The staffing adequacy window 471 is shown in screen 601i, and allows a user to edit the scaling values and configure trip settings as desired. For example, with the settings of FIG. 11A, a score of 100 will be given if there is more than one full time equivalent (FTE) staff member per 50 housing units. Again, it is possible to change the scale for each risk profile. For example, it may be expected that assisted-living housing may have higher staff-to-unit ratio than other types of housing, and screen 601i allows different risk profiles to be created that allow these variations to be taken into account. the Screen 601j illustrates the management competence/expertise window 473 which allows a user to edit the scaling values and configure trip settings as desired.

Figure 12:
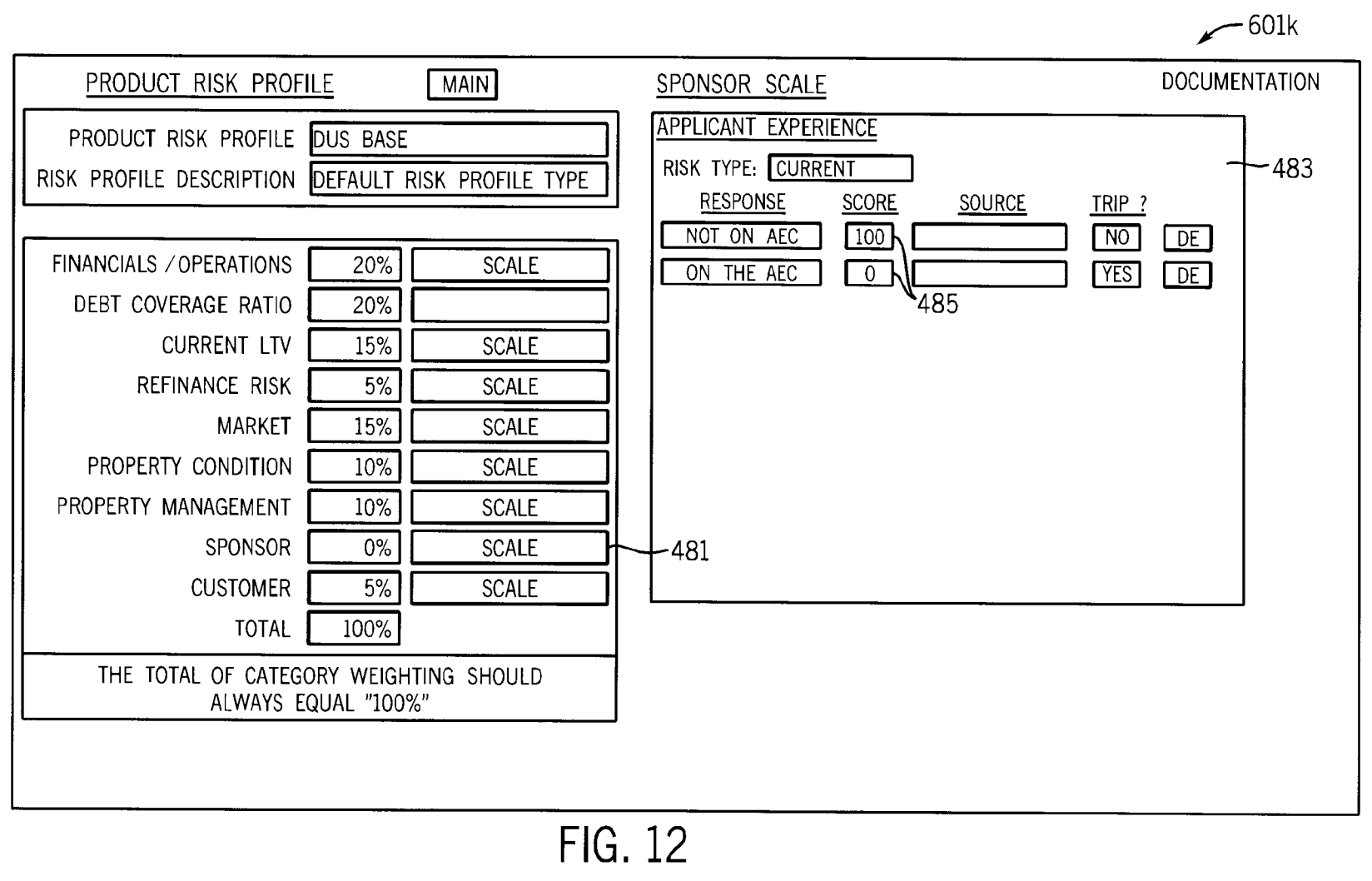

FIG. 12 provides screen 601k which illustrates an example of additional details of the sponsor category. A user may select the scale button 481 to open the sponsor scale box (shown as field 483). Once this box is opened, the user may edit the scaling values (fields 485) and configure trip settings as desired.

Figure 13:
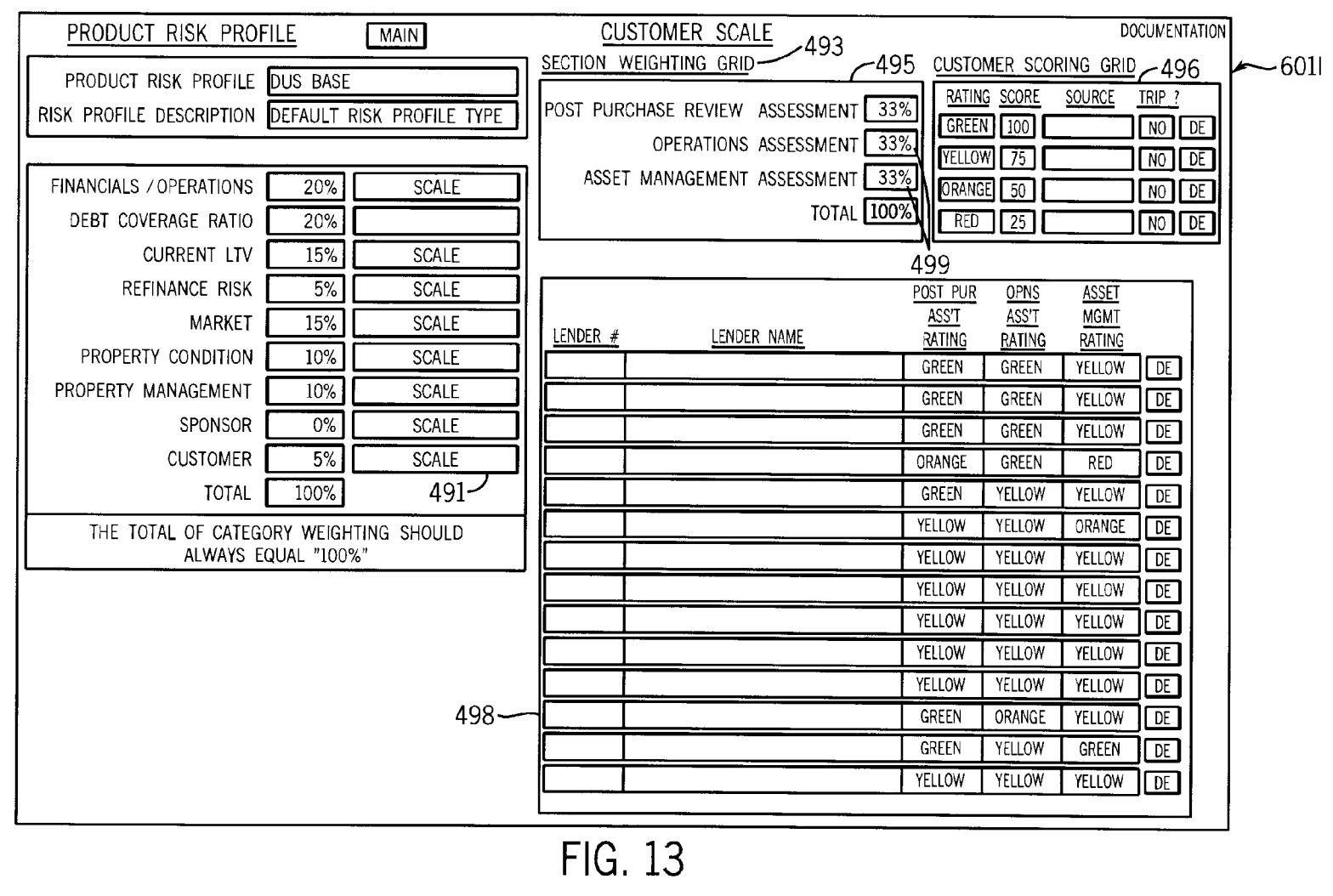

FIG. 13 provides screen 601l which illustrates an example of additional details of the customer category. A user may select the scale button 491 to open the current customer scale window 493. The Customer scale window 493 includes a section weighting window 495, a customer scoring window 496, and a detailed listing of scores of particular lenders (window 498). The section weighting window 493 allows the user to edit the weighting applied to three different subcategories including post purchase review assessment, operations assessment, and asset management assessment (e.g., a user may edit the weighting applied to one or more assessment categories). Accordingly, a user may edit the weighting values (fields 499) and configure trip settings as desired.

Figure 14:
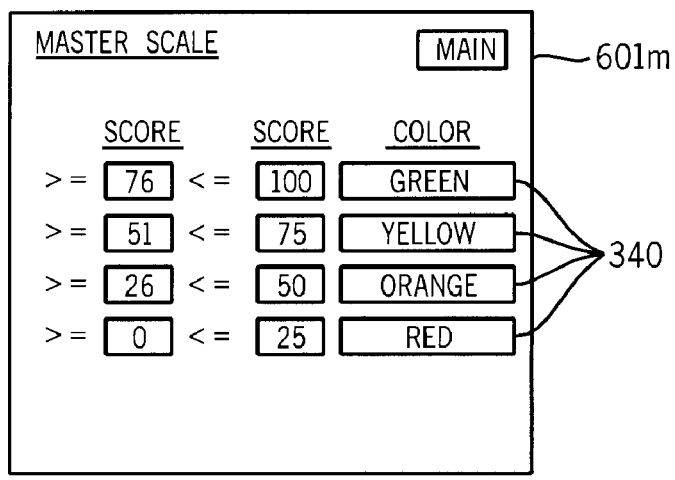

Referring back to FIG. 4, by choosing to view/maintain the master scale (button 104), a user is taken to the screen 601m shown in FIG. 14. Referring to screen 601m, value ranges may generally be defined for each of the overall rating categories (fields 340). When the investment rating engine 117 generates a score for a particular category or subcategory, and the score is displayed to an operator, the score is preferably color-coded in accordance with the scale shown in FIG. 14 for ease of viewing. The scale defined in fields 340 for identifying the rating categories acts as the master for all rating engine determinations. According to an exemplary embodiment, four rating categories (fields 340) are defined, including "green," "yellow," "orange," or "red." The green rating indicates that a category/subcategory is performing at or above original expectations. The yellow rating indicates that a category/subcategory is performing satisfactorily, however, there may be some indication of stress. An asset (or investment) manager may or should be engaged with the lender in connection with this category/subcategory. The orange rating indicates that a category/subcategory is somewhat troublesome and an asset manager may or should be actively partnering with the lender for solutions. The red rating indicates that a category/subcategory needs significant corrective action to prevent loss. The user may also be provided with the ability to add or delete rating categories (e.g., to define six levels instead of four so that ratings are displayed at a higher level of granularity). According to alternative embodiments, any number of other and/or additional categories may be used to classify the investments (e.g., different color schemes, value ranges, numbers, letters, names, etc.).

Referring back to FIG. 4, a new debt coverage ratio profile can be added in a similar manner as described above with respect to new risk profile templates. It may be noted that, in FIG. 6, no scale button is provided next to the debt coverage ratio category. Configuration of the debt coverage ratio category occurs by way of the view/maintain DSCR button 106 in FIG. 4. As with the product risk profile, a new DSCR profile may be created based on an existing DSCR profile.

Figure 15:
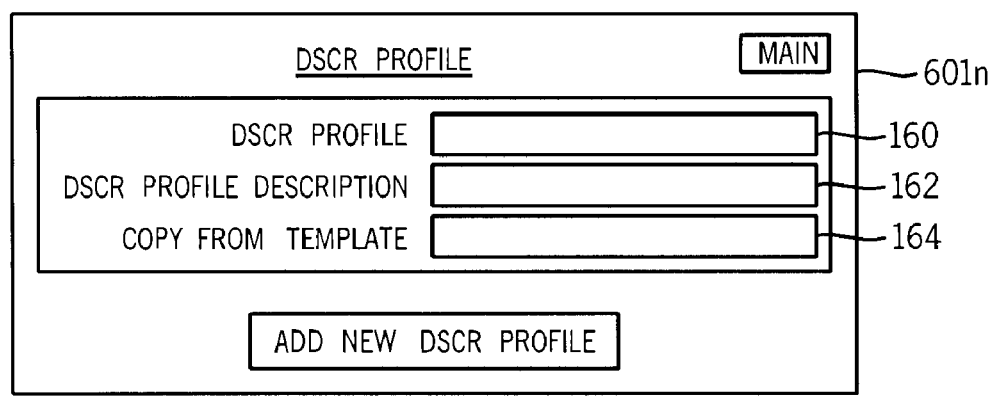

Referring to FIG. 15, screen 601n is shown according to an exemplary embodiment. Screen 601n may be used to provide an interface for adding a new DSCR risk profile. A new risk profile template is added by receiving a user-specified name for the new DSCR profile (field 160), receiving a user-specified description for the new DSCR profile (field 162), and receiving an identification of an existing profile from which the weighting details are to be copied from (field 164).

FIGS. 16-17 provide screen 601o and 601p which may be used in connection with displaying existing DSCR profiles or facilitating creation of new DSCR risk profiles. In FIG. 16, screen 601o shows a DSCR profile which has been named DUS DC Base as shown in field 180a and which has been described as a default debt coverage profile as shown in field 180b. With the settings as shown in FIG. 16, a DSCR ratio greater than or equal to 1.25 yields a score of 100, a DSCR ratio greater than or equal to 1.15 but less than 1.25 yields a score of 75, a DSCR ratio greater than or equal to 1.05 but less than 1.15 yields a score of 50, and a DSCR ratio less than 1.05 yields a score of 25 and also causes a trip to be generated. Again, either the scales or the trip settings may be adjusted. By adjusting the trip settings to include additional trips, for example, the trips may also be generated at other levels (e.g., below 1.15, below 1.25).

FIG. 17 provides screen 601p which shows a DSCR profile which has been named DUS DC COOP as indicated by field 180b and which has been described as a risk profile for DUS Coop loans. Coop loans are typically expected to have lower DSCR ratios, as indicated by the scaling in FIG. 17. It may also be noted that the profile in FIG. 17 has more scale levels (seven as compared to four in FIG. 16). Accordingly, the scaling is adjustable not only in the thresholds that are used but also in the number of ranges that are used. Although not specifically shown elsewhere, the same arrangement is used for other categories and subcategories in which scales are used.

B. Rating Engine Results Interface and Workflow Interface

Figure 18A:
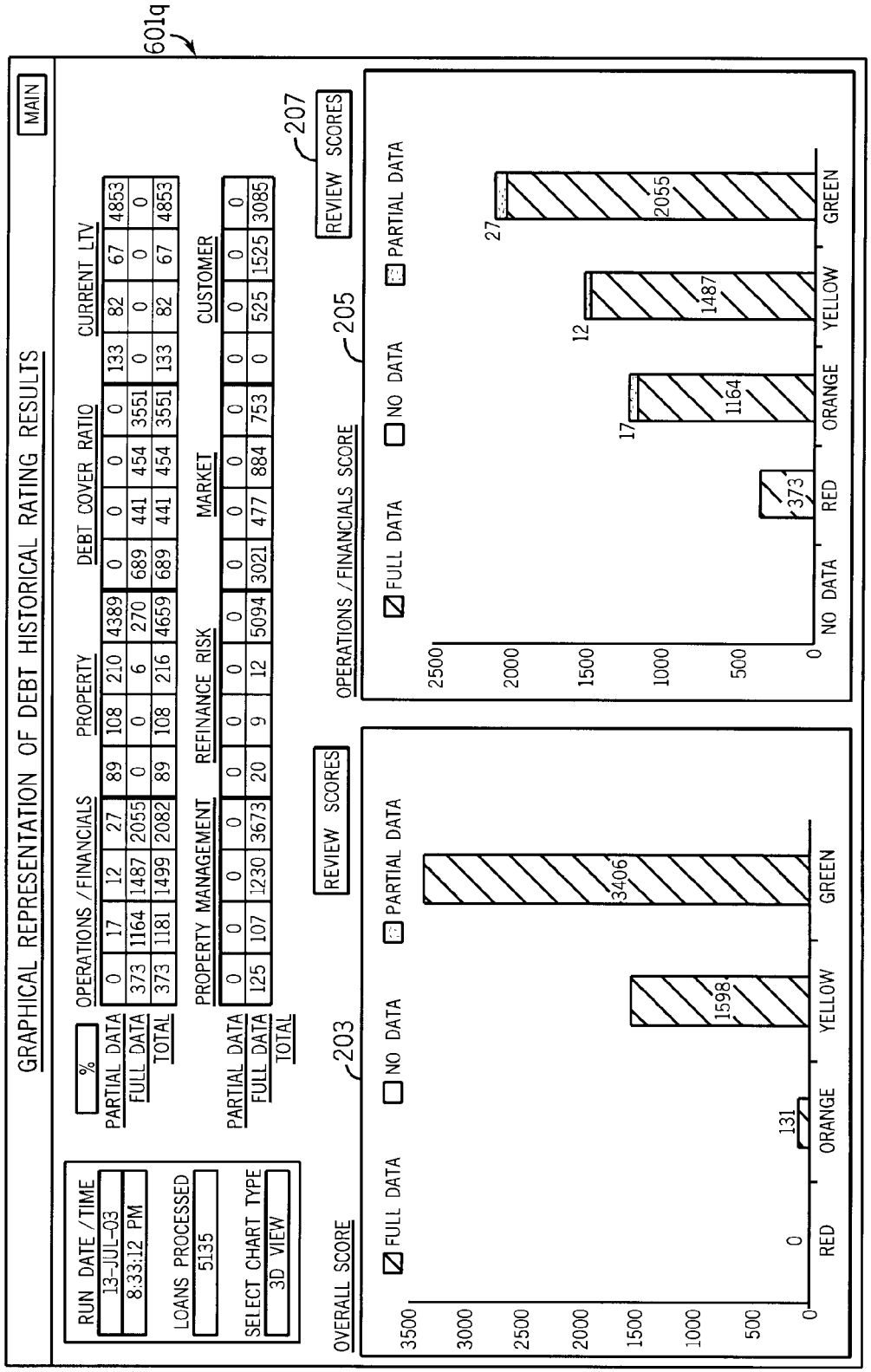
Figure 18B:
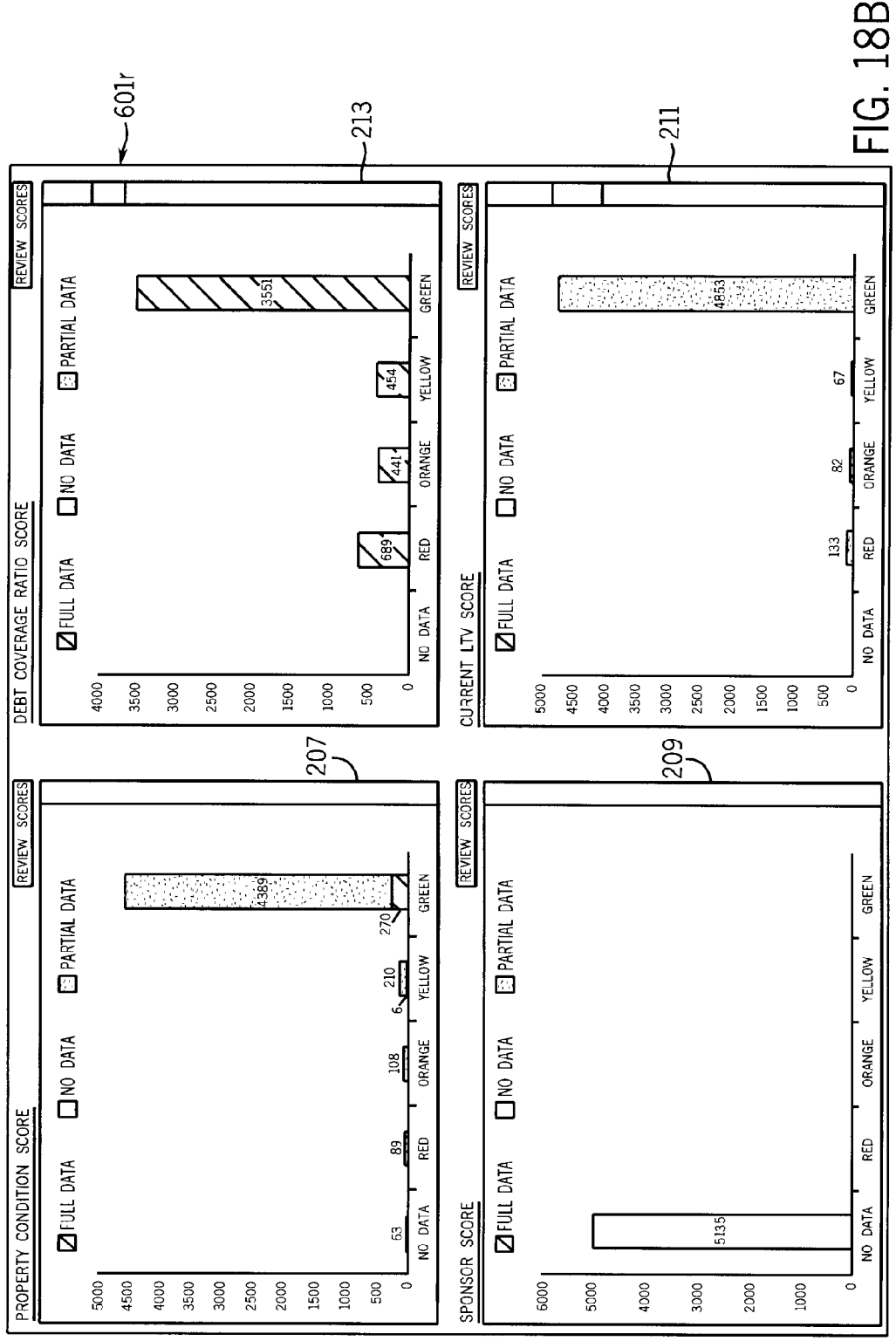
Figure 18C:
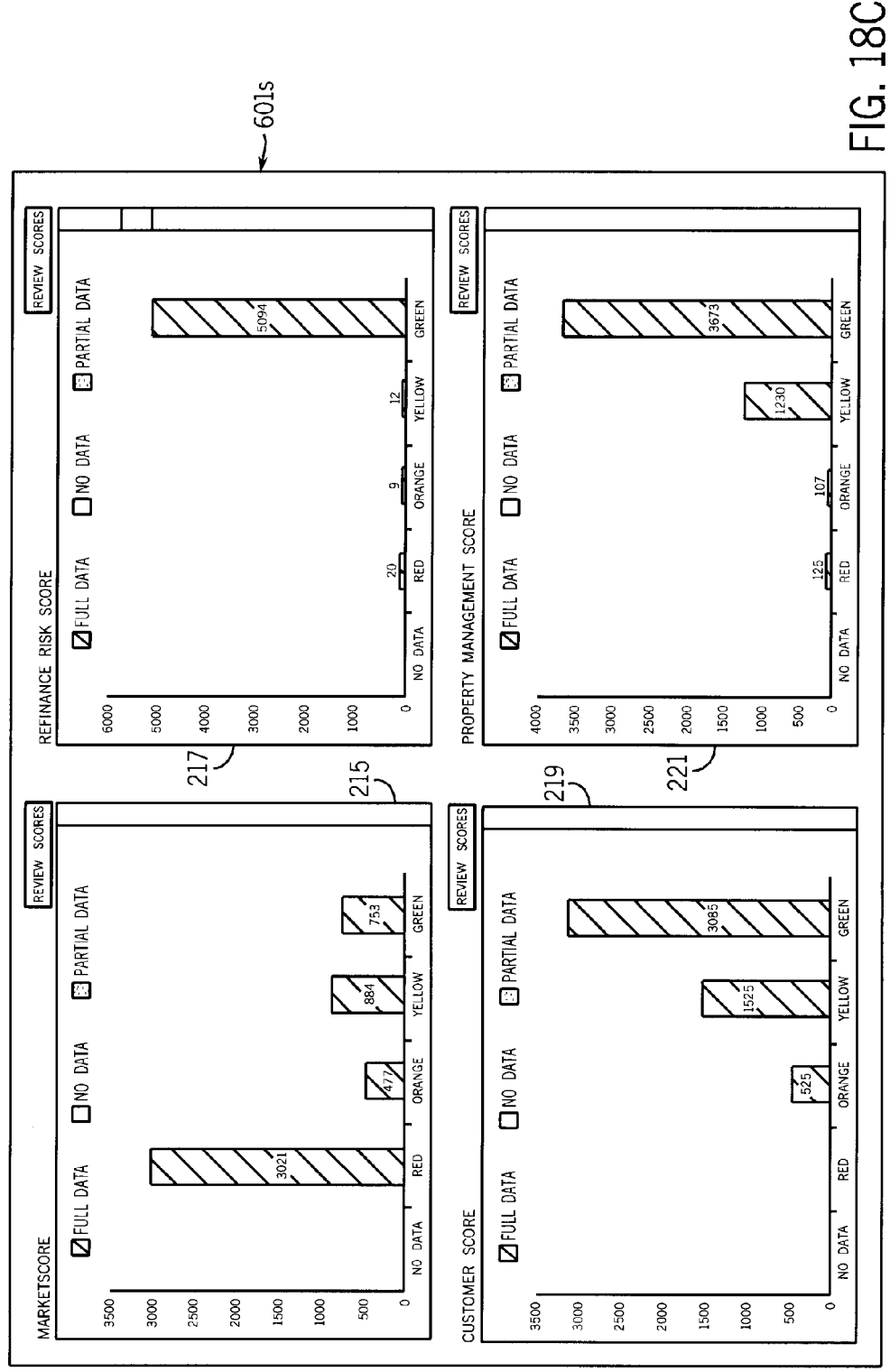

After the investment rating engine 117 rates the investments in the database 116, the user may be presented with historical rating engine results as shown in FIGS. 18A-18C, 19, 20A-20B, 21 and 22 which are accessible to the user via button 108 in screen 601b of FIG. 4. Run date and time and product risk profile selections may be received from the user via fields 113 and 117, respectively. After receiving these selections, the system generates the graphical summary representation of historical rating results for the date and time selected and for the risk profile selected, as shown in FIGS. 18A-18C.

FIG. 18A shows graphical representations of the overall score graph 203 and operations/financials score graph 205. FIG. 18B shows graphical representations for property condition 207, debt coverage ratio score 213, sponsor score 209, and current LTV score 211. FIG. 18C shows graphical representations for market score 215, refinance risk score 217, customer score 219, and property management score 221.

FIG. 18A also shows a missing data summary by category. For each category, the number of loans with partial and full data is shown. Depending on how missing data is treated, missing data may result in lower scores for the associated categories and subcategories. Accordingly, presenting the user with a missing data summary enables the user to understand the reason as to why the investment may have been scored high or low or average by the investment rating engine 117.

A user is also provided with the ability to drill down on the data for a particular one of the summary graphs 203-221 by pressing a review score button 207 associated with each graph. For example, if the user presses the review score button 207 for the overall score summary graph 203, the user is taken to a screen 601t shown in FIG. 19. FIG. 19 shows scores generated by the investment rating engine 117 for a portfolio of loans on a loan-by-loan and category-by-category. (Although only a limited number of loans is shown in FIG. 19, the dashed arrows indicate that the list of loans may be much longer than what is shown in FIG. 19.) Each score is presented as a numeric score and is presented in a box which is color coded in accordance with the master scale of FIG. 14. For example, where a particular category received a score of 100, the 100 is displayed in a box which is generally green except for where the number 100 is displayed. This feature simplifies the presentation of the summary information and allows a user to quickly focus on those loans that scored poorly and also obtain an overall assessment of how various loans performed in various categories. Also displayed for each loan is a field indicating whether any trips occurred.

Figure 20B:
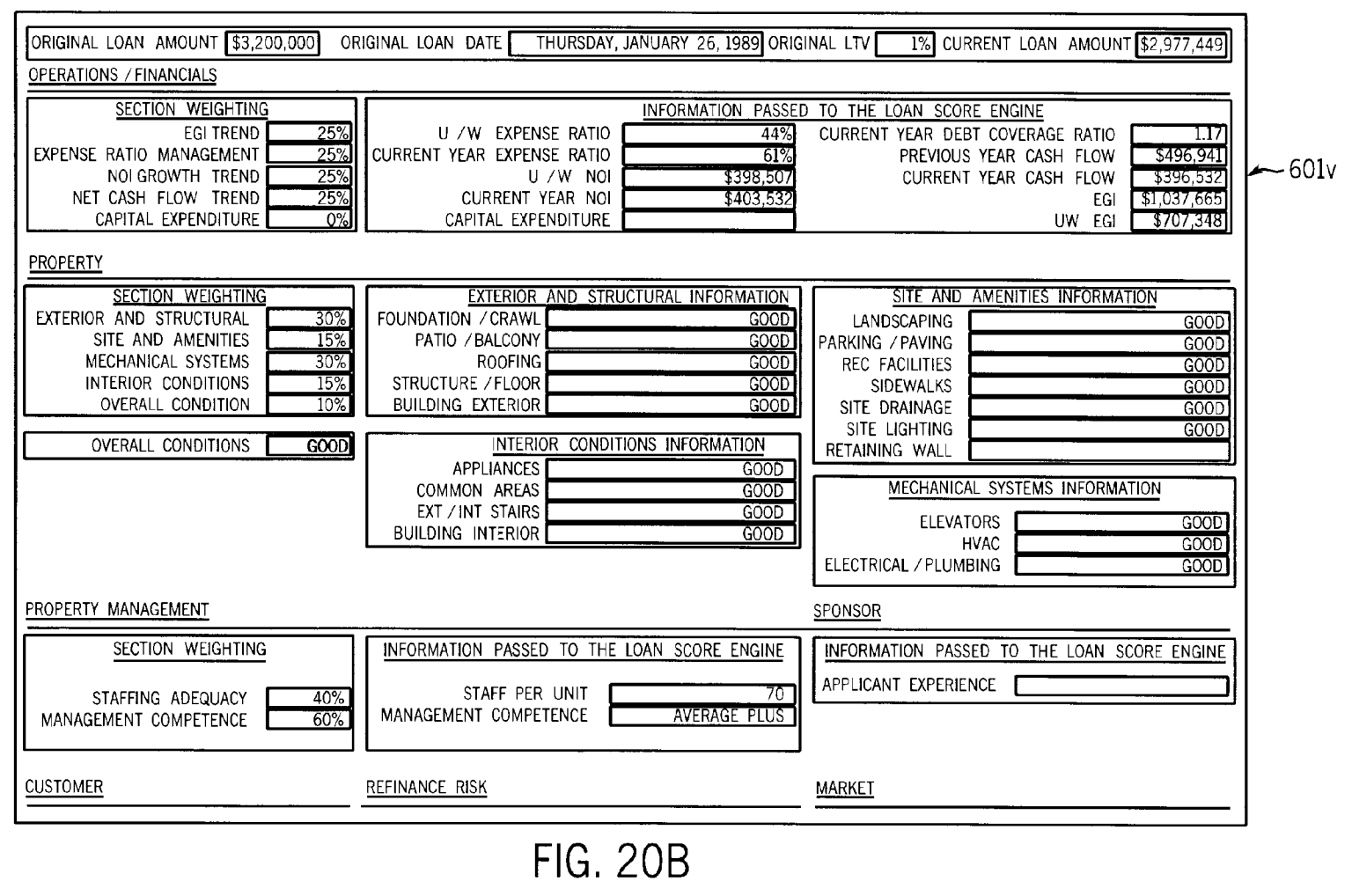

A user is also provided with the ability to drill down on a particular loan by pressing the "+" button 223 associated with a particular loan of interest. If the user presses button 223 for a particular loan, the user is presented with data such as shown in screens 601u, 600v, and 600w of FIGS. 20A-20C. In FIG. 20A, the user is shown the weighting given to each category for the particular risk profile used to generate the score (for informational purposes), the system-generated score for each category, and the asset manager score for each category. As previously noted, the asset manager has the ability to override the system-generated score. Also shown are fields for system-generated comments and asset manager comments for each category. For example, for the sponsor category, the system-generated comments indicate that a score of zero was received because of missing data. In the lower portion of FIG. 20A, screen 601u indicates that a trip was generated due to refinance risk.

In FIGS. 20B and 20C, additional information is provided for the loan for each of the categories 208. Also shown is the weighting provided to each category. The weighting is provided for informational purposes and the user does not have the ability to adjust the weighting in screens 601u, 600v, and 600w. The data used by the investment rating engine 117 to generate the scores is also shown in screens 601u, 600v, and 600w.

Referring again to FIGS. 18A-18C, as another example, if the user presses the review scores button 207 for the operations/financials category, the user is taken to screen 601x shown in FIG. 21. FIG. 21 shows a detailed listing of loans along with a detailed showing of data that went into generating the operations/financials score for each loan. As another example, if the user presses the review scores button 207 in FIG. 18B for the debt service coverage ratio category, the user is taken to screen 601y shown in FIG. 22. FIG. 22 shows a detailed listing of loans along with a detailed showing of data that went into generating the debt service coverage ratio score for each loan.

Referring now to FIGS. 23-26, the investment rating engine 117 may be used by asset managers as a workflow management tool. FIG. 23 shows a portfolio of loans which may be managed by one or more asset managers. An asset manager is provided with the ability to filter or sort the loans by any field, such as the review status field, the asset manager field, the trip field, or the overall rating field. In FIG. 23, the loans are depicted as being sorted by review status. As a workflow management tool, the system 10 is used to ensure that each loan is reviewed by an asset manager, including ensuring that any trips are addressed and that the system-generated score is reviewed and approved (either with or without modification). The system 10 is configured to require that trips be affirmatively addressed by the asset manager, and the interface includes fields associated with each trip to receive confirmation that the respective trip has been addressed. The review status indicator in FIG. 23 indicates whether a particular loan has been reviewed or remains open. It may be noted that the list of open loans is displayed from worst (loans with the lowest overall rating) to best (loans with the highest overall rating). This allows the asset manager to quickly identify the worst loan that remains open and start activities with that loan.

The loan rating graph button 240 and the loan rating detail button 242 may be pressed by the user to receive information as discussed above in connection with FIGS. 18A-18C, 19, 20A-20B, 21 and 22. As shown in FIGS. 24-26, the asset manager may drill down on a particular loan and be provided with more detailed information via screens 601aa-601cc. Again, the asset manager can see the weighting that were used to generate scores but does not have the ability to modify them in screens 601aa-601cc. The asset manager can modify system-generated scores. The asset manager is provided with the ability to review recent financial statements (via a financial statements button) from the lender or property owner which may provide textual explanations for the data which result in upward or downward revisions of the data. The asset manager is also provided with the ability to review results of inspections (via an inspections button).

As shown in FIG. 24, an action plan/watchlist button 250 provides a link to an action plan and watchlist for troubled assets. The action plan includes a summary of any problems associated with the investment, any remedial action that the lender is taking, and any additional comments and other tasks that may need to be performed on either the lender or the investor side to return the loan to a more favorable status. The output of the investment rating engine 117 may also be used to generate a list of tasks to be performed by an asset manager in connection with a troubled investment. The system 10 can manage the list of tasks to be performed by an asset manager (e.g., categorized by loan, prioritized by importance, and so on). The watchlist is driven by the investment rating engine 117 and includes investments across all asset classes for each lender. If the overall score is less than green, the loan is added to the watch list and an action plan is created to return the investment to a more favorable status. A tool may be provided to address routine tasks.

As shown in FIG. 26, loss forecasting information may also be provided. In the illustrated embodiment, loss forecasting on a loan-by-loan basis is performed only for loans with a red overall rating. A separate, portfolio-level loss forecasting may be performed for loans with a yellow or orange overall rating. Alternatively, loss forecasting on a loan-by-loan basis may also be performed for loans with a yellow or orange overall rating.

The investment rating engine 117 may be implemented by the logic shown as deal management logic 110, data management logic 112, and trending and analysis logic 114 in "System and Method for Managing Data Pertaining to a Plurality of Financial Assets for Multifamily and Housing Development" Ser. No. 11/026,102, filed simultaneously herewith, and hereby incorporated by reference. In this configuration, the user interface logic 115 and the database 116 of the system described herein may be implemented by the user interface logic 106 and the database 118, respectively, of the system described in the aforementioned application. Likewise, the data received from the counterparty data sources 120 may be processed by the cash flow management logic 116.

Although the investment rating engine 117 has been described in the context of multifamily investments, it will appreciated that the investment rating engine 117 may also be used in connection with other types of investments. For example, the techniques described herein in connection with the investment rating engine 117 could also be used in connection with single family loans, commercial loans, and so on.

The investment rating engine 117 may also be used to rate potential investments. For example, the investment rating engine 117 may be used to implement an automated underwriting engine for evaluating potential new investments. In this configuration, assumptions may be made regarding financial operations and other parameters used to generate a loan rating. These assumptions may then be used as input data into the investment rating engine 117. The investment rating engine 117 then returns a score for the investment based on the assumptions, allowing an assessment to be obtained as to the risk of an investment (e.g., relative to other investments of the same type) assuming all of the assumptions are correct.

The invention is described herein with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

It should be noted that although flow charts may be provided herein showing a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and/or in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

It is important to note that the above-described embodiments are illustrative only. Although the invention has been described in conjunction with specific embodiments thereof, those skilled in the art will appreciate that numerous modifications are possible without materially departing from the novel teachings and advantages of the subject matter described herein. Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangements of the preferred and other exemplary embodiments without departing from the spirit of the present invention.

What is claimed is:

1. A property investment management system comprising:
    machine-readable media having machine-executable instructions stored therein;
    a machine including a processor that reads and executes the instructions stored in the machine-readable media, the machine and the machine-readable media in combination implementing;
    user interface logic that provides a user interface accessible to a user, the user interface logic including risk profile configuration logic used by the user to define a plurality of different risk profiles related to property-related investments and risk factors associated with such investments;
    an investment rating engine coupled to the user interface logic, the investment rating engine being configured to evaluate the property-related investments according to the plurality of different risk profiles;
    wherein the investment rating engine retrieves data from one or more external sources, the external sources being at least one of (i) credit information and (ii) property valuation data;
    wherein the investment rating engine triggers one or more trips based on the evaluation of the specific risk profile and risk factors related to a particular investment;

wherein the plurality of different risk profiles provide different weightings to the different categories of data, and wherein the risk profiles are configurable according to the nature of the risks associated with the different ones of the property-related investments; and wherein the investment rating engine generates a rating for each investment, and wherein the investment rating engine outputs a list of tasks based on the rating to a workflow management tool.

2. The system of claim 1, wherein the risk factors include at least one of (i) the historic financial performance of the property, (ii) the property condition details, (iii) the value of the property or properties serving as collateral, (iv) the credit information of the property owner, and (v) the credit information of the lender.

3. The system of claim 1, wherein the investment rating engine evaluates the investments based on a plurality of categories of data, and wherein the plurality of different risk profiles provide different scaling for the different categories of data.

4. The system of claim 1, wherein the investment rating engine evaluates the investments based on a plurality of categories of data, wherein the investment rating engine generates the one or more trips based on the plurality of categories of data, and wherein trip settings for the trips are separately configurable for the plurality of different risk profiles.

5. The system of claim 1, further comprising a workflow management interface logic, the workflow management interface logic receiving from the investment rating engine at least one of (i) the list of tasks, (ii) details of the one or more trips, (iii) the risk profiles, and (iv) the risk factors.

6. The system of claim 5, wherein the workflow management interface logic places investments on a watch list of troubled investments based on output of the investment rating engine.

7. The system of claim 5, wherein the workflow management interface logic tracks status of the one or more trips generated for investments by the investment rating engine, including whether an asset manager has reviewed the trip.

8. The system of claim 5, wherein the workflow management interface logic maintains a watch list of troubled investments and action plans for investments on the watch list of troubled investments.

9. The system of claim 5, wherein the workflow management interface logic assists asset managers by prioritizing asset management and loss mitigation activities by identifying those properties that are at a greater risk for default.

10. The system of claim 1, wherein the user interface logic provides an asset manager with an option to override the rating.

11. The system of claim 10, wherein the rating is provided to a loss forecasting engine and is used to perform loss forecasting.

12. The system of claim 1, wherein at least a portion of the data is received from third parties.

13. The system of claim 1, wherein the property-related investments include debt-based investments, equity-based investments, and bond-based investments.

14. The system of claim 1, wherein the property-related investments are existing investments.

15. The system of claim 1, wherein the investment rating engine generates an overall evaluation of risk associated with the plurality of different investments.

16. The system of claim 1, wherein the investment rating engine generates the one or more trips based on specific issues of concern in connection with the property related investments.

17. The system of claim 1, wherein the investment rating engine assigns at least one investment into one of a plurality of discrete risk categories based on the evaluation.

18. A computer-implemented method of providing risk information regarding property investments comprising:

receiving, by user interface logic, investment information that relates to various characteristics of the property investments that are currently managed, the user interface logic being implemented by machine-readable media having machine-executable instructions stored therein and by a machine including a processor that reads and executes the instructions stored in the machine-readable media;

generating, by an investment rating engine, a risk level determination for the property investments based on one of a plurality of different stored risk profiles, wherein the investment rating engine is implemented by the machine and the machine-readable media, and wherein the plurality of different risk profiles provide different weightings to the different categories of data;

wherein the risk profiles are configurable according to the nature of the risks associated with the different ones of the plurality of investments;

evaluating, by the investment rating engine, the property investments according to the plurality of risk profiles;

displaying the risk level determination;

triggering, by the investment rating engine, a trip using the investment rating engine based on the evaluation of the specific risk profile and risk factors related to a particular investment; and outputting the trip to the user interface logic to implement a workflow management tool, the trip flagging an issue for further review by the user.

19. The method of claim 18, further comprising providing overall results of the risk level determination.

\* \* \* \* \*